(12) United States Patent
Lee et al.

(10) Patent No.: US 6,773,371 B2
(45) Date of Patent: Aug. 10, 2004

(54) FAMILY OF MULTI-SPEED TRANSMISSIONS HAVING INTERCONNECTED PLANETARY GEARSETS AND INPUT CLUTCHES

(75) Inventors: Chunhao J. Lee, Troy, MI (US); Chi-Kuan Kao, Troy, MI (US); Madhusudan Raghavan, West Bloomfield, MI (US); Patrick Benedict Usoro, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/283,021

(22) Filed: Oct. 29, 2002

(65) Prior Publication Data

US 2004/0082430 A1 Apr. 29, 2004

(51) Int. Cl.[7] .................................................. F16H 3/44
(52) U.S. Cl. ..................... 475/296; 475/276; 475/330
(58) Field of Search ..................... 475/296, 271, 475/275, 276, 280, 293, 311, 313, 317, 319, 323, 325, 330

(56) References Cited

U.S. PATENT DOCUMENTS

| | | | |
|---|---|---|---|
| 4,070,927 A | 1/1978 | Polak | 74/765 |
| 4,660,439 A * | 4/1987 | Hiraiwa | 475/276 |
| 4,709,594 A | 12/1987 | Maeda | 74/753 |
| 5,090,952 A * | 2/1992 | Asada | 475/278 |
| 5,098,357 A * | 3/1992 | Asada et al. | 475/278 |
| 5,106,352 A | 4/1992 | Lepelletier | 475/280 |
| 5,226,862 A * | 7/1993 | Hattori | 475/286 |
| 5,599,251 A | 2/1997 | Beim et al. | 475/275 |
| 6,053,839 A | 4/2000 | Baldwin et al. | 475/281 |
| 6,071,208 A | 6/2000 | Koivunen | 475/275 |
| 6,083,135 A | 7/2000 | Baldwin et al. | 475/276 |
| 6,217,474 B1 | 4/2001 | Ross et al. | 475/269 |
| 6,425,841 B1 * | 7/2002 | Haka | 475/275 |

FOREIGN PATENT DOCUMENTS

| | | | | |
|---|---|---|---|---|
| JP | 02154845 A | * | 6/1990 | ............ F16H/3/66 |
| JP | 02154846 A | * | 6/1990 | ............ F16H/3/66 |
| JP | 9-126283 | | 5/1997 | |

* cited by examiner

Primary Examiner—Tisha D Lewis
(74) Attorney, Agent, or Firm—Kathryn A. Marra

(57) ABSTRACT

A family of power transmissions wherein each family member includes three planetary gearsets each having three members and six selectively engageable torque-transmitting mechanisms. The planetary gearsets have members that are continuously interconnected by at least three interconnecting members. The torque-transmitting mechanisms are selectively engaged in combinations of two to establish at least seven forward speed ratios and one reverse speed ratio in the three planetary gearsets.

5 Claims, 9 Drawing Sheets

| Ratios | | 50 | 52 | 54 | 56 | 58 | 60 |
|---|---|---|---|---|---|---|---|
| Reverse | -2.96 | | | X | | | X |
| Neutral | 0.00 | | | X | | | |
| 1 | 3.57 | | | X | X | | |
| 2 | 2.52 | | X | | X | | |
| 3 | 1.85 | | X | X | | | |
| 4 | 1.52 | | X | | | X | |
| 5 | 1.00 | | | | X | X | |
| 6 | 0.67 | X | | | | X | |
| 7 | 0.54 | X | | | X | | |

(X = engaged)

Ring Gear/Sun Gear Tooth Ratios: $\frac{R1}{S1}=1.52, \frac{R2}{S2}=1.54, \frac{R3}{S3}=2.96$

| Ratio Spread | 6.67 |
|---|---|
| Ratio Steps | |
| Rev/1 | -0.83 |
| 1/2 | 1.42 |
| 2/3 | 1.36 |
| 3/4 | 1.22 |
| 4/5 | 1.52 |
| 5/6 | 1.65 |
| 6/7 | 1.13 |

| Ratios |  | 150 | 152 | 154 | 156 | 158 | 160 |
|---|---|---|---|---|---|---|---|
| Reverse | -2.96 |  |  | X |  |  | X |
| Neutral | 0.00 |  |  | X |  |  |  |
| 1 | 3.57 |  |  | X | X |  |  |
| 2 | 2.52 |  | X |  | X |  |  |
| 3 | 1.85 |  | X | X |  |  |  |
| 4 | 1.52 |  | X |  |  | X |  |
| 5 | 1.00 |  |  | X |  | X |  |
| 6 | 0.61 | X |  |  |  | X |  |
| 7 | 0.54 | X |  |  | X |  |  |

(X = engaged)

Ring Gear/Sun Gear Tooth Ratios: $\frac{R1}{S1}=1.52, \frac{R2}{S2}=1.54, \frac{R3}{S3}=2.96$

| Ratio Spread | 6.67 |
|---|---|
| Ratio Steps |  |
| Rev/1 | -0.83 |
| 1/2 | 1.42 |
| 2/3 | 1.36 |
| 3/4 | 1.22 |
| 4/5 | 1.52 |
| 5/6 | 1.65 |
| 6/7 | 1.13 |

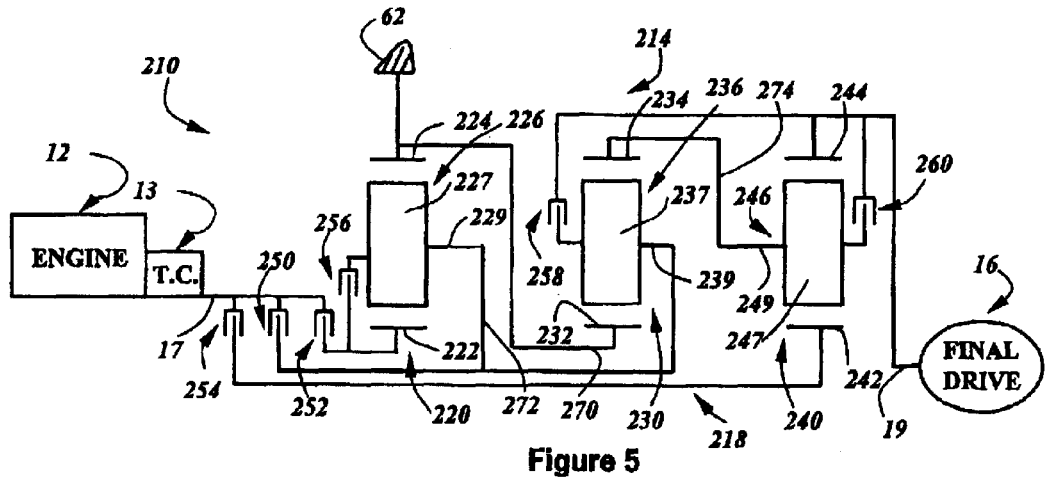

| | Ratios | 350 | 352 | 354 | 356 | 358 | 360 |
|---|---|---|---|---|---|---|---|
| Reverse | -2.96 | | | X | X | | |
| Neutral | 0.00 | | | X | | | |
| 1 | 3.57 | | | X | | X | |
| 2 | 2.52 | | X | | | X | |
| 3 | 1.85 | | X | X | | | |
| 4 | 1.52 | | X | | | | X |
| 5 | 1.00 | | | X | | | X |
| 6 | 0.61 | X | | | | | X |
| 7 | 0.64 | X | | | X | | |

(X = engaged)

Ring Gear/Sun Gear Tooth Ratios: $\frac{R1}{S1} = 1.52, \frac{R2}{S2} = 1.54, \frac{R3}{S3} = 2.96$

| Ratio Spread | 6.67 |
|---|---|
| Ratio Steps | |
| Rev/1 | -0.83 |
| 1/2 | 1.42 |
| 2/3 | 1.36 |
| 3/4 | 1.22 |
| 4/5 | 1.52 |
| 5/6 | 1.65 |
| 6/7 | 1.13 |

| | Ratios | 450 | 452 | 454 | 456 | 458 | 460 |
|---|---|---|---|---|---|---|---|
| Reverse | -2.96 | | | X | | X | |
| Neutral | 0.00 | | | X | | | |
| 1 | 3.57 | | | X | X | | |
| 2 | 2.52 | | X | | X | | |
| 3 | 1.85 | | X | X | | | |
| 4 | 1.52 | | X | | | | X |
| 5 | 1.00 | | | | X | | X |
| 6 | 0.67 | X | | | | | X |
| 7 | 0.54 | X | | | X | | |

(X = engaged)

Ring Gear/Sun Gear Tooth Ratios: $\frac{R1}{S1}=1.52, \frac{R2}{S2}=1.54, \frac{R3}{S3}=2.96$

| Ratio Spread | 6.67 |
|---|---|
| Ratio Steps | |
| Rev/1 | -0.83 |
| 1/2 | 1.42 |
| 2/3 | 1.36 |
| 3/4 | 1.22 |
| 4/5 | 1.52 |
| 5/6 | 1.65 |
| 6/7 | 1.13 |

(X = engaged)

Ring Gear/Sun Gear Tooth Ratios: $\frac{R1}{S1}=1.89, \frac{R2}{S2}=1.54, \frac{R3}{S3}=2.95$

| Ratio Spread | 6.54 |
|---|---|
| Ratio Steps | |
| Rev/1 | -0.40 |
| 1/2 | 1.54 |
| 2/3 | 1.47 |
| 3/4 | 1.49 |
| 4/5 | 1.11 |
| 5/6 | 1.19 |
| 6/7 | 1.47 |

| Ratios | | 650 | 652 | 654 | 656 | 658 | 660 |
|---|---|---|---|---|---|---|---|
| Reverse | -1.53 | | | X | | | X |
| Neutral | 0.00 | | X | | | | |
| 1 | 2.57 | | | X | X | | |
| 2 | 1.56 | X | | | X | | |
| 3 | 1.00 | X | | X | | | |
| 4 | 0.83 | X | | | | X | |
| 5 | 0.67 | | | X | | X | |
| 6 | 0.50 | | X | | | X | |
| 7 | 0.48 | | X | X | | | |

(X = engaged)

Ring Gear/Sun Gear Tooth Ratios: $\frac{R1}{S1}=1.52, \frac{R2}{S2}=1.97, \frac{R3}{S3}=1.53$

| Ratio Spread | 5.58 |
|---|---|
| Ratio Steps | |
| Rev/1 | -0.57 |
| 1/2 | 1.61 |
| 2/3 | 1.56 |
| 3/4 | 1.20 |
| 4/5 | 1.45 |
| 5/6 | 1.15 |
| 6/7 | 1.05 |

| Ratios | | 750 | 752 | 754 | 756 | 758 | 760 |
|---|---|---|---|---|---|---|---|
| Reverse | -1.53 | | | X | X | | |
| Neutral | 0.00 | | | X | | | |
| 1 | 2.67 | | | X | | X | |
| 2 | 1.66 | X | | | | X | |
| 3 | 1.00 | X | | X | | | |
| 4 | 0.83 | X | | | | | X |
| 5 | 0.57 | | | X | | | X |
| 6 | 0.50 | | X | | | | X |
| 7 | 0.48 | | X | X | | | |

(X = engaged)

Ring Gear/Sun Gear Tooth Ratios: $\frac{R1}{S1}=1.52, \frac{R2}{S2}=1.97, \frac{R3}{S3}=1.53$

| Ratio Spread | 5.58 |
|---|---|
| Ratio Steps | |
| Rev/1 | -0.57 |
| 1/2 | 1.61 |
| 2/3 | 1.66 |
| 3/4 | 1.20 |
| 4/5 | 1.45 |
| 5/6 | 1.15 |
| 6/7 | 1.05 |

| | Ratios | 850 | 852 | 854 | 856 | 858 | 860 |
|---|---|---|---|---|---|---|---|
| Reverse | -0.94 | | X | X | | | |
| Neutral | 0.00 | | X | | | | |
| 1 | 2.28 | | X | | | X | |
| 2 | 1.48 | | X | | X | | |
| 3 | 1.00 | | X | | | | X |
| 4 | 0.67 | X | X | | | | |
| 5 | 0.60 | X | | | | | X |
| 6 | 0.50 | X | | | X | | |
| 7 | 0.34 | X | | | | X | |

(X = engaged)

Ring Gear/Sun Gear Tooth Ratios: $\frac{R1}{S1} = 1.52, \frac{R2}{S2} = 2.95, \frac{R3}{S3} = 2.94$

| Ratio Spread | 6.73 |
|---|---|
| Ratio Steps | |
| Rev/1 | -0.41 |
| 1/2 | 1.54 |
| 2/3 | 1.48 |
| 3/4 | 1.49 |
| 4/5 | 1.11 |
| 5/6 | 1.20 |
| 6/7 | 1.48 |

FAMILY OF MULTI-SPEED TRANSMISSIONS HAVING INTERCONNECTED PLANETARY GEARSETS AND INPUT CLUTCHES

TECHNICAL FIELD

This invention relates to planetary transmissions and, more particularly, to planetary transmissions having three planetary gearsets that are controlled to establish at least seven forward speed ratios and one reverse speed ratio.

BACKGROUND OF THE INVENTION

Automatic shifting power transmissions are currently used in a majority of the vehicles produced in the United States. These vehicles generally employ three- and four-speed power transmissions. More recently, a trend towards more ratios, such as five- and six-speed power transmissions, has been proposed. In fact, some manufacturers do provide five-speed transmissions. Many of the vehicles utilizing manual type transmissions or countershaft type transmissions employ five- and six-speed power transmissions.

The five- and six-speed power transmissions provide improved vehicle acceleration performance and fuel economy when compared with three- and four-speed transmissions. Seven-speed transmissions offer further vehicle acceleration performance and fuel economy over five- and six-speed transmissions. However, seven-speed power transmissions have not been proposed due to the complexity of these assemblies, as well as size and cost. There are many current patents that describe five- and six-speed power transmissions. Some of the six-speed power transmission patents, especially those assigned to the assignee of the present invention, describe six-speed power transmissions in families, wherein one or more family members incorporate a seven-speed power transmission.

SUMMARY OF THE INVENTION

It is an object of the present invention to provide an improved family of multi-speed planetary transmissions having three planetary gearsets and providing at least seven forward speed ratios and one reverse speed ratio.

In one aspect of the present invention, each of the planetary gearsets has first, second, and third members.

In another aspect of the present invention, an interconnecting member continuously interconnects the first member of the first planetary gearset with a first member of the second planetary gearset.

In yet another aspect of the present invention, a second fixed interconnection continuously interconnects a second member of the first planetary gearset with a second member of the second planetary gearset.

In yet still another aspect of the present invention, a third fixed interconnecting member continuously interconnects a first member of the third planetary gearset with one of the members of the second or first planetary gearset.

In still another aspect of the present invention, a member of the first planetary gearset is continuously connected with a stationary member, such as a transmission housing.

In a yet still another aspect of the present invention, the output of the transmission is continuously interconnected with at least one member of one of the planetary gearsets, and the input shaft is only selectively connectible with members of the planetary gearsets through selectively engageable torque transmitting mechanisms.

In yet another aspect of the present invention, the planetary transmission has six torque-transmitting mechanisms, at least two of which selectively interconnect the input shaft of the transmission with members of the planetary gearsets.

In a further aspect of the present invention, a third of the torque-transmitting mechanisms selectively interconnects a member of one of the planetary gearsets with either the input shaft, the output shaft, or another member of one of the planetary gearsets.

In a yet further aspect of the present invention, a fourth of the of the torque-transmitting mechanisms selectively interconnects a member of at least one of the planetary gearsets with the output shaft, or another member of one of the planetary gearsets.

In a still further aspect of the present invention, a fifth of the torque-transmitting mechanisms selectively interconnects a member of one of the planetary gearsets with another member of one of the planetary gearsets.

In a yet still further aspect of the present invention, a sixth of the torque-transmitting mechanisms selectively interconnects a member of one of the planetary gearsets with either the output shaft, another member of one of the planetary gearsets, or with the stationary transmission member.

In still a further aspect of the present, the six torque-transmitting mechanisms are selectively engageable in combinations of two to establish at least seven forward speed ratios and one reverse speed ratio between the input shaft and the output shaft of the transmission.

The present invention provides a family of low mechanical content seven speed power transmissions. These transmissions have only three planetary gearsets and six selectively engageable torque-transmitting mechanisms, which may be comprised of six clutches or five clutches and one brake. Each of the planetary gearsets has three members comprised of a sun gear member, a ring gear member, or a planet carrier assembly member. Each planet carrier assembly member can be of either the single pinion type (simple) or of the double pinion type (compound).

The six torque-transmitting mechanisms are arranged to provide interconnections between the planetary gearset members or between the input shaft or transmission housing and the planetary gear members. By engaging these torque-transmitting mechanisms in combinations of two, the three planetary gearsets will provide at least seven forward speed ratios and one reverse speed ratio between the input shaft and the output shaft of the transmission.

DESCRIPTION OF THE DRAWINGS

FIG. 5 is a schematic representation of a powertrain having another member of the family of transmissions incorporated therein.

FIG. 6 is truth table and chart depicting some of the operating parameters of the powertrain shown in FIG. 6.

DESCRIPTION OF THE EXEMPLARY EMBODIMENTS

Figures 1, 2:
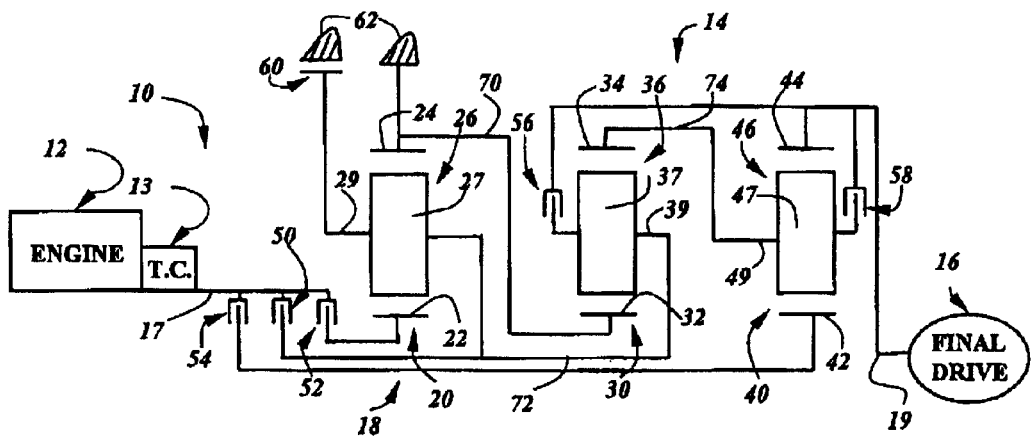
FIG. 1 is a schematic representation of a powertrain having one family member incorporated therein.
FIG. 2 is a truth table and chart depicting some of the operating parameters of the powertrain shown in FIG. 1.

Referring to the drawings, wherein like characters represent the same or corresponding parts throughout the several views, there is seen in FIG. 1 a powertrain 10, having a conventional prime mover or engine 12, a starting device such as a torque converter 13, a planetary transmission 14, and a conventional final drive mechanism 16. The final drive mechanism is, of course, connected in a well-known manner to the drive wheels of a vehicle, not shown. The planetary transmission 14 includes an input shaft 17, a planetary gear arrangement 18, and an output shaft 19.

The planetary gear arrangement 18 includes a planetary gearset 20 having a sun gear member 22, a ring gear member 24, and a planet carrier assembly member 26. The planet carrier assembly member 26 includes a plurality of pinion gears 27 rotatably mounted on a planet carrier member 29 and disposed in meshing relationship with the sun gear member 22 and the ring gear member 24.

The planetary gear arrangement 18 also has a second planetary gearset 30, which includes a sun gear member 32, a ring gear member 34, and a planet carrier assembly member 36. The planet carrier assembly member 36 includes a plurality of pinion gears 37 rotatably mounted on a planet carrier member 39 and disposed in meshing relationship with the sun gear member 32 and the ring gear member 34.

The planetary gear arrangement 18 has a further planetary gearset 40, which includes a sun gear member 42, a ring gear member 44, and a planet carrier assembly member 46. The planet carrier assembly member 46 includes a plurality of pinion gears 47 rotatably mounted on a planet carrier member 49 and disposed in meshing relationship with the sun gear member 42 and the ring gear member 44.

The planetary gear arrangement 18 also includes six torque-transmitting mechanisms 50, 52, 54, 56, 58, and 60.

The torque-transmitting mechanism 60 is a stationary type torque-transmitting mechanism, commonly termed a brake. The torque-transmitting mechanisms 50, 52, 54, 56, and 58 are rotating type torque-transmitting mechanisms, commonly termed clutches. Each of the torque-transmitting mechanisms is a fluid-operated friction type device, which are well known in the art. The rotating type torque-transmitting mechanisms are preferably multiple disc type clutches, which have a fluid-operated piston for engagement, and the stationary type torque-transmitting mechanism is either a multiple disc type brake having a fluid-operated piston as the engagement member or a band brake, which includes hydraulic or fluid servo mechanisms to control the engagement thereof. The construction and operation of these torque-transmitting mechanisms is well known by those skilled in the art.

The ring gear member 24 and sun gear member 32 are continuously interconnected by an interconnecting member 70, which is also continuously interconnected with a stationary member of the transmission, such as a housing 62. The planet carrier assembly member 26 and planet carrier assembly member 36 are continuously interconnected by an interconnecting member 72. The ring gear member 34 and the planet carrier assembly member 46 are continuously interconnected by an interconnecting member 74. The ring gear member 44 is continuously connected with the output shaft 19.

The input shaft 17 is selectively connectible with the interconnecting member 72 through the torque-transmitting mechanism 50, and selectively connectible with the sun gear member 22 through the torque-transmitting mechanism 52, and selectively connectible with the sun gear member 42 through the torque-transmitting mechanism 54. The interconnecting member 72 is selectively connectible with the output shaft 19 and the ring gear member 44 through the torque-transmitting mechanism 56. The interconnecting member 74 is selectively interconnectible with the output shaft 19 and the ring gear member 44 through the torque-transmitting mechanism 58. The planet carrier assembly member 26 and therefore the interconnecting member 72 is selectively connectible with the transmission housing 62 through the torque-transmitting mechanism 60.

As seen in the truth table of FIG. 2, the torque-transmitting mechanisms 50, 52, 54, 56, 58, and 60 are selectively engaged in combinations of two to permit the establishment of seven forward speed ratios and one reverse speed ratio in the planetary gear arrangement 18 between the input shaft 17 and the output shaft 19. It can be readily determined from the truth table that all the single step forward interchanges are of the single transition variety. Also given in the truth table of FIG. 2 is an example of the numerical ratios that are available with the planetary gear arrangement 18 when these combinations of engagements are employed. The numerical values for the speed ratios are established by the ring gear/sun gear tooth ratios of the planetary gearsets 20, 30, and 40 as illustrated in FIG. 2 as R1/S1, R2/S2, and R3/S3, respectively. A chart in FIG. 2 provides the numerical values of the ratio steps between adjacent forward speed ratios as well as between the reverse and first forward speed ratio. The chart also illustrates the numerical value of the overall ratio spread of the forward speed ratios.

The reverse speed ratio is established with the engagement of the torque-transmitting mechanisms 54 and 60. The planetary carrier assembly member 46 is held stationary in this engagement. During the reverse speed ratio, the ring gear member 44 and therefore output shaft 19 are rotated at a speed determined by the speed of the sun gear member 42 and the ring gear/sun gear tooth ratio of the planetary gearset 40. The numerical value of the reverse speed ratio is determined by the ring gear/sun gear tooth ratio of the planetary gearset 40.

The first forward speed ratio is established with the engagement of the torque-transmitting mechanisms 54 and 56. It should be noted that a reverse-to-first forward interchange is possible with a single swapping of torque-transmitting mechanisms by permitting the torque-transmitting mechanism 54 to remain engaged through a neutral condition. During the first forward speed ratio, the planet carrier assembly member 46 and ring gear member 34 are rotated at a speed determined by the speed of the sun gear member 42, the speed of the ring gear member 44, and the ring gear/sun gear tooth ratio of the planetary gearset 40. The planet carrier assembly member 36, ring gear member 44 and therefore output shaft 19 are rotated at a speed determined by the speed of the ring gear member 34 and the ring gear/sun gear tooth ratio of the planetary gearset 30. The numerical value of the first forward speed ratio is determined by the ring gear/sun gear tooth ratios of the planetary gearsets 30 and 40.

The second forward speed ratio is established with the engagement of the torque-transmitting mechanisms 52 and 56. During the second forward speed ratio, the planet carrier assembly member 26 is connected directly with the output shaft 19. The planet carrier assembly member 26 and therefore output shaft 19 are rotated at a speed determined by the speed of the sun gear member 22 and the ring gear/sun gear tooth ratio of the planetary gearset 20. The numerical value of the first forward speed ratio is determined by the ring gear/sun gear tooth ratio of the planetary gearset 20.

The third forward speed ratio is established with the engagement of the torque-transmitting mechanisms 52 and 54. During the third forward speed ratio, the planet carrier assembly members 26 and 36 are rotated at a speed determined by the speed of the sun gear member 22 and the ring gear/sun gear tooth ratio of the planetary gearset 20. The ring gear member 34 and planet carrier assembly member 46 are rotated at a speed determined by the speed of the planet carrier assembly member 36 and the ring gear/sun gear tooth ratio of the planetary gearset 30. The ring gear member 44 and therefore output shaft 19 are rotated at a speed determined by the speed of the sun gear member 42, the speed of the planet carrier assembly member 46, and the ring gear/sun gear tooth ratio of the 40. The numerical value of the third forward speed ratio is determined by the ring gear/sun gear tooth ratios of all three planetary gearsets 20, 30, and 40.

The fourth forward speed ratio is established with the engagement of the torque-transmitting mechanisms 52 and 58. During the fourth forward speed ratio, the planet carrier assembly members 26 and 36 are rotated at a speed determined by the speed of the sun gear member 22 and the ring gear/sun gear tooth ratio of the planetary gearset 20. The ring gear member 34, planetary gearset 40, and the output shaft 19 are rotated at a speed determined by the speed of the planet carrier assembly member 36 and the ring gear/sun gear tooth ratio of the planetary gearset 30. The numerical value of the fourth forward speed ratio is determined by the ring gear/sun gear tooth ratios of the planetary gearsets 20 and 30.

The fifth forward speed ratio is established with the engagement of the torque-transmitting mechanisms 54 and 58. During the fifth forward speed ratio, the planetary gearset 40 is rotated in unison with the input shaft 17 and therefore the output shaft 19 rotates in unison with the input shaft 17. The numerical value of the fifth forward speed ratio is one.

The sixth forward speed ratio is established with the engagement of the torque-transmitting mechanisms 50 and 58. During the sixth forward speed ratio, the ring gear member 34, planetary gearset 40, and output shaft 19 are rotated at a speed determined by the speed of the planet carrier assembly member 36 and the ring gear/sun gear tooth ratio of the planetary gearset 30. The numerical value of the sixth forward speed ratio is determined by the ring gear/sun gear tooth ratio of the planetary gearset 30.

The seventh forward speed ratio is established with the engagement of the torque-transmitting mechanisms 50 and 54. During the seventh forward speed ratio, the ring gear member 34 and planet carrier assembly member 46 are rotated at a speed determined by the speed of the planet carrier assembly member 36 and the ring gear/sun gear tooth ratio of the planetary gearset 30. The ring gear member 44 and therefore output shaft 19 are rotated at a speed determined by the speed of the planet carrier assembly member 46, the speed of the sun gear member 42, and the ring gear/sun gear tooth ratio of the planetary gearset 40. The numerical value of the seventh forward speed ratio is determined by the ring gear/sun gear tooth ratios of the planetary gearsets 30 and 40.

Figures 3, 4:
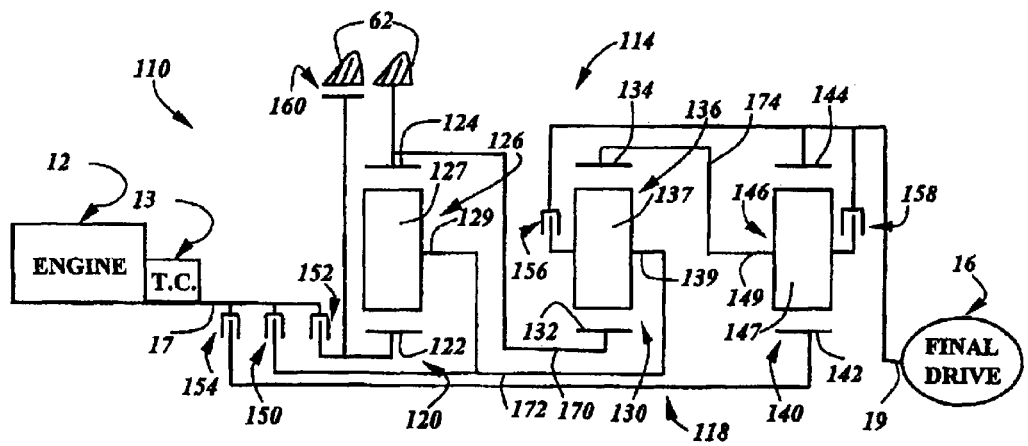
FIG. 3 is a schematic representation of a powertrain having another member of the family of transmissions incorporated therein.
FIG. 4 is truth table and chart depicting some of the operating parameters of the powertrain shown in FIG. 3.

A powertrain 110, shown in FIG. 3, includes the engine 12, the staring device 13, a planetary transmission 114, and the final drive mechanism 16. The planetary transmission 114 includes the input shaft 17, a planetary gear arrangement 118, and the output shaft 19.

The planetary gear arrangement 118 includes a planetary gearset 120 having a sun gear member 122, a ring gear member 124, and a planet carrier assembly member 126. The planet carrier assembly member 126 includes a plurality of pinion gears 127 rotatably mounted on a planet carrier member 129 and disposed in meshing relationship with the sun gear member 122 and the ring gear member 124.

The planetary gear arrangement 118 also has a second planetary gearset 130, which includes a sun gear member 132, a ring gear member 134, and a planet carrier assembly member 136. The planet carrier assembly member 136 includes a plurality of pinion gears 137 rotatably mounted on a planet carrier member 139 and disposed in meshing relationship with the sun gear member 132 and the ring gear member 134.

The planetary gear arrangement 118 has a further planetary gearset 140, which includes a sun gear member 142, a ring gear member 144, and a planet carrier assembly member 146. The planet carrier assembly member 146 includes a plurality of pinion gears 147 rotatably mounted on a planet carrier member 149 and disposed in meshing relationship with the sun gear member 142 and the ring gear member 144.

The planetary gear arrangement 118 also includes six torque-transmitting mechanisms 150, 152, 154, 156, 158, and 160. The torque-transmitting mechanism 160 is a stationary type torque-transmitting mechanism, while the remaining torque-transmitting mechanisms are of the rotating type torque-transmitting mechanisms.

The sun gear member 132 and ring gear member 124 are continuously interconnected by an interconnecting member 170, which is continuously interconnected with the transmission housing 62. The planet carrier assembly member 126 and planet carrier assembly member 136 are continuously interconnected by an interconnecting member 172.

The ring gear member 134 and planet carrier assembly member 146 are continuously interconnected by an interconnecting member 174. The output shaft 19 is continuously interconnected with the ring gear member 144.

The input shaft 17 is selectively interconnectible with the interconnecting member 172 through the torque-transmitting mechanism 150, selectively connectible with the sun gear member 122 through the torque-transmitting mechanism 152, and selectively connectible with the sun gear member 142 through the torque-transmitting mechanism 154. The sun gear member 122 is selectively connectible with the transmission housing 62 through the torque-transmitting mechanism 160. The output shaft 19 and therefore ring gear member 144 are selectively interconnectible with the interconnecting member 172 through the torque-transmitting mechanism 156, and selectively connectible with the interconnecting member 174 through the torque-transmitting mechanism 158.

As seen in the truth table of FIG. 4, the torque-transmitting mechanisms are engaged in combinations of two to establish seven forward speed ratios and one reverse speed ratio in the planetary gear arrangement 118 between the input shaft 17 and the output shaft 19. It can be readily determined from the truth table that all the single step forward interchanges are of the single transition variety. Also given in the truth table is a numerical example of the speed ratios that are available with the planetary gear arrangement 118 when the ring gear/sun gear tooth ratios of the planetary gearsets 120, 130, and 140 are selected as shown in FIG. 4 as R1/S1, R2/S2, and R3/S3, respectively. A chart in FIG. 4 gives the numerical example of the ratio steps between adjacent forward speed ratios as well as between the reverse and first forward speed ratio when the ratio values of the truth table are employed. The chart of FIG. 4 also gives a numerical example of the overall ratio spread of the forward speed ratios.

The reverse speed ratio is established with the engagement of the torque-transmitting mechanisms 154 and 160. During the reverse speed ratio, the ring gear member 144 and therefore output shaft 19 are rotated at a speed determined by the speed of the sun gear member 142 and the ring gear/sun gear tooth ratio of the planetary gearset 140. The numerical value of the first forward speed ratio is determined by the ring gear/sun gear tooth ratio of the planetary gearset 140.

The first forward speed ratio is established with the engagement of the torque-transmitting mechanisms 154 and 156. During the first forward speed ratio, the planet carrier assembly member 146 and ring gear member 134 are rotated at a speed determined by the speed of the sun gear member 142, the speed of the ring gear member 144, and the ring gear/sun gear tooth ratio of the 140. The planet carrier assembly member 136, ring gear member 144, and output shaft 19 are rotated at a speed determined by the speed of the ring gear member 134 and the ring gear/sun gear tooth ratio of the planetary gearset 130. The numerical value of the first forward speed ratio is determined by the ring gear/sun gear tooth ratios of the planetary gearsets 130 and 140.

The second forward speed ratio is established with the engagement of the torque-transmitting mechanisms 152 and 156. During the second forward speed ratio, the planet carrier assembly members 126 and 136, the ring gear member 144, and output shaft 19 are rotated at a speed determined by the speed of the sun gear member 122 and the ring gear/sun gear tooth ratio of the planetary gearset 120. The numerical value of the second forward speed ratio is determined by the ring gear/sun gear tooth ratio of the planetary gearset 120.

The third forward speed ratio is established with the engagement of the torque-transmitting mechanisms 152 and 154. During the third forward speed ratio, the planet carrier assembly members 126 and 136 are rotated at a speed determined by the speed of the sun gear member 122 and the ring gear/sun gear tooth ratio of the planetary gearset 120. The ring gear member 134 and planet carrier assembly member 146 are rotated at a speed determined by the speed of the planet carrier assembly member 136 and the ring gear/sun gear tooth ratio of the planetary gearset 130. The ring gear member 144 and therefore output shaft 19 are rotated at a speed determined by the speed of the planet carrier assembly member 146, the speed of the sun gear member 142, and the ring gear/sun gear tooth ratio of the planetary gearset 140. The numerical value of the third forward speed ratio is determined by the ring gear/sun gear tooth ratios of all three planetary gearsets 120, 130, and 140.

The fourth forward speed ratio is established with the engagement of the torque-transmitting mechanisms 152 and 158. During the fourth forward speed ratio, the planet carrier assembly members 126 and 136 are rotated at a speed determined by the speed of the sun gear member 122 and the ring gear/sun gear tooth ratio of the planetary gearset 120. The ring gear member 134, the planetary gearset 140, and the output shaft 19 are rotated at a speed determined by the speed of the planet carrier assembly member 136 and the ring gear/sun gear tooth ratio of the planetary gearset 130. The numerical value of the fourth forward speed ratio is determined by the ring gear/sun gear tooth ratios of the planetary gearsets 120 and 130.

The fifth forward speed ratio is established with the engagement of the torque-transmitting mechanisms 154 and 158. During the fifth forward speed ratio, the planetary gearset 140 is rotated in unison with the input shaft 17 and the output shaft 19 to provide a speed ratio having a numerical value of one.

The sixth forward speed ratio is established with the engagement of the torque-transmitting mechanisms 150 and 158. During the sixth forward speed ratio, the ring gear member 134, planetary gearset 140, and the output shaft 19 are rotated at a speed determined by the speed of the planet carrier assembly member 136 and the ring gear/sun gear tooth ratio of the planetary gearset 130. The numerical value of the sixth forward speed ratio is determined by the ring gear/sun gear tooth ratio of the planetary gearset 130.

The seventh forward speed ratio is established with the engagement of the torque-transmitting mechanisms 150 and 154. During the seventh forward speed ratio, the ring gear member 134 and planet carrier assembly member 146 are rotated at a speed determined by the speed of the planet carrier assembly member 136 and the ring gear/sun gear tooth ratio of the planetary gearset 130. The ring gear member 144 and therefore output shaft 19 are rotated at a speed determined by the speed of the sun gear member 142, the speed of the planet carrier assembly member 146, and the ring gear/sun gear tooth ratio of the planetary gearset 140. The numerical value of the seventh forward speed ratio is determined by the ring gear/sun gear tooth ratios of the planetary gearsets 130 and 140.

A powertrain 210, shown in FIG. 5, includes the engine 12, the staring device 13, a planetary transmission 214, and the final drive mechanism 16. The planetary transmission 214 includes the input shaft 17, a planetary gear arrangement 218, and the output shaft 19. The planetary gear arrangement 218 includes three planetary gearsets 220, 230, and 240.

The planetary gearset 220 includes a sun gear member 222, a ring gear member 224, and a planet carrier assembly member 226. The planet carrier assembly member 226 includes a plurality of pinion gears 227 rotatably mounted on a planet carrier member 229 and disposed in meshing relationship with the sun gear member 222 and the ring gear member 224.

The planetary gearset 230 includes a sun gear member 232, a ring gear member 234, and a planet carrier assembly member 236. The planet carrier assembly member 236 includes a plurality of pinion gears 237 rotatably mounted on a planet carrier member 239 and disposed in meshing relationship with the sun gear member 232 and the ring gear member 234.

The planetary gearset 240 includes a sun gear member 242, a ring gear member 244, and a planet carrier assembly member 246. The planet carrier assembly member 246 includes a plurality of pinion gears 247 rotatably mounted on a planet carrier member 249 and disposed in meshing relationship with the sun gear member 242 and the ring gear member 244.

The planetary gear arrangement 218 also includes six torque-transmitting mechanisms 250, 252, 254, 256, 258, and 260. All of these torque-transmitting mechanisms are of the rotating type torque-transmitting mechanisms.

The ring gear member 224 and sun gear member 232 are continuously interconnected by an interconnecting member 270, which is continuously interconnected with the transmission housing 62. The planet carrier assembly member 226 and planet carrier assembly member 236 are continuously interconnected by an interconnecting member 272. The ring gear member 234 and planet carrier assembly member 246 are continuously interconnected by an interconnecting member 274. The output shaft 19 is continuously interconnected with the ring gear 244.

The input shaft 17 is selectively connectible with the interconnecting member 272 through the torque-transmitting mechanism 250, selectively connectible with the sun gear member 222 through the torque-transmitting mechanism 252, and selectively connectible with the sun gear member 242 through the torque-transmitting mechanism 254. The ring gear member 244 is continuously interconnected with the output shaft 19 and selectively connectible with the interconnecting member 272 through the torque-transmitting mechanism 258, and selectively connectible with the interconnecting member 274 through the torque-transmitting mechanism 260. The interconnecting member 272 is selectively connectible with the sun gear member 222 through the torque-transmitting mechanism 256.

As seen in the truth table of FIG. 6, the torque-transmitting mechanisms are engaged in combinations of two to provide seven forward speed ratios and one reverse speed ratio between the input shaft 17 and the output shaft 19 through the planetary gear arrangement 218. It can be readily determined from the truth table that all the single step forward interchanges are of the single transition variety. The truth table also gives an example of numerical values for the speed ratios of the planetary gear arrangement 218. These speed ratios are determined by the ring gear/sun gear tooth ratios of the planetary gearsets 220, 230, and 240. The ring gear/sun gear tooth ratios of the planetary gearsets are given by way of example in FIG. 6 as R1/S1, R2/S2, and R3/S3, respectively. A chart in FIG. 6 gives the numerical values for the ratio steps between adjacent forward speed ratios as well as between the reverse and first forward speed ratio, and also the numerical value of the overall ratio spread of the forward speed ratios.

The reverse speed ratio is established with the engagement of the torque-transmitting mechanisms 254 and 256. During the reverse speed ratio, the ring gear member 244 and therefore output shaft 19 are rotated at a speed determined by the speed of the sun gear member 242 and the ring gear/sun gear tooth ratio of the planetary gearset 240. The numerical value of the reverse speed ratio is determined by the ring gear/sun gear tooth ratio of the planetary gearset 240.

The first forward speed ratio is established with the engagement of the torque-transmitting mechanisms 254 and 258. During the first forward speed ratio, the planet carrier assembly member 246 and ring gear member 234 are rotated at a speed determined by the speed of the sun gear member 242, the speed of the ring gear member 244, and the ring gear/sun gear tooth ratio of the planetary gearset 240. The planet carrier assembly member 236, ring gear member 244, and output shaft 19 are rotated at a speed determined by the speed of the ring gear member 234 and the ring gear/sun gear tooth ratio of the planetary gearset 230. The numerical value of the first forward speed ratio is determined by the ring gear/sun gear tooth ratios of the planetary gearsets 230 and 240.

The second forward speed ratio is established with the engagement of the torque-transmitting mechanisms 252 and 258. During the second forward speed ratio, the planet carrier assembly members 226 and 236, the ring gear member 244, and the output shaft 19 are rotated at a speed determined by the speed of the sun gear member 222 and the ring gear/sun gear tooth ratio of the planetary gearset 220. The numerical value of the second forward speed ratio is determined by the ring gear/sun gear tooth ratio of the planetary gearset 220.

The third forward speed ratio is established with the engagement of the torque-transmitting mechanisms 252 and 254. During the third forward speed ratio, the planet carrier assembly members 236 and 226 are rotated at a speed determined by the speed of the sun gear member 222 and the ring gear/sun gear tooth ratio of the planetary gearset 220. The ring gear member 234 and planet carrier assembly member 246 are rotated at a speed determined by the speed of the planet carrier assembly member 236 and the ring gear/sun gear tooth ratio of the planetary gearset 230. The ring gear member 244 and therefore output shaft 19 are rotated at a speed determined by the speed of the planet carrier assembly member 246, the speed of the sun gear member 242, and the ring gear/sun gear tooth ratio of the planetary gearset 240. The numerical value of the third forward speed ratio is determined by the ring gear/sun gear tooth ratios of all three planetary gearsets 220, 230, and 240.

The fourth forward speed ratio is established with the engagement of the torque-transmitting mechanisms 252 and 260. During the fourth forward speed ratio, the planet carrier assembly members 236 and 226 are rotated at a speed determined by the speed of the sun gear member 222 and the ring gear/sun gear tooth ratio of the planetary gearset 220. The ring gear member 234, the planetary gearset 240, and the output shaft 19 are rotated at a speed determined by the speed of the planet carrier assembly member 236 and the ring gear/sun gear tooth ratio of the planetary gearset 230. The numerical value of the fourth forward speed ratio is determined by the ring gear/sun gear tooth ratios of the planetary gearsets 220 and 230.

The fifth forward speed ratio is established with the engagement of the torque-transmitting mechanisms 254 and 260. During the fifth forward speed ratio, the input shaft 17, the output shaft 19, and the planetary gearset 240 rotate in unison. Therefore, the numerical value of the fifth forward speed ratio is one.

The sixth forward speed ratio is established with the engagement of the torque-transmitting mechanisms 250 and 260. During the sixth forward speed ratio, the ring gear member 234, planetary gearset 240, and the output shaft 19 are rotated at a speed determined by the speed of the planet carrier assembly member 236 and the ring gear/sun gear tooth ratio of the planetary gearset 230. The numerical value of the sixth forward speed ratio is determined by the ring gear/sun gear tooth ratio of the planetary gearset 230.

The seventh forward speed ratio is established with the engagement of the torque-transmitting mechanisms 250 and 254. During the seventh forward speed ratio, the ring gear member 234 and planet carrier assembly member 246 are rotated at a speed determined by the speed of the planet carrier assembly member 236 and the ring gear/sun gear tooth ratio of the planetary gearset 230. The ring gear member 244 and therefore output shaft 19 are rotated at a speed determined by the speed of the planet carrier assembly member 246, the speed of the sun gear member 242, and the ring gear/sun gear tooth ratio of the planetary gearset 240. The numerical value of the seventh forward speed ratio is determined by the ring gear/sun gear tooth ratios of the planetary gearsets 230 and 240.

Figures 7, 8:
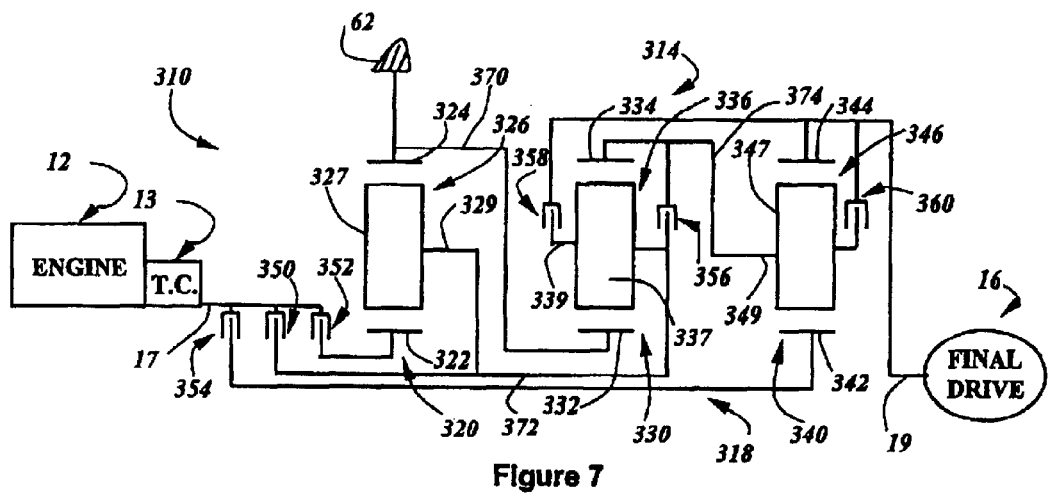
FIG. 7 is a schematic representation of a powertrain having another member of the family of transmissions incorporated therein.
FIG. 8 is truth table and chart depicting some of the operating parameters of the powertrain shown in FIG. 7.

A powertrain 310, shown in FIG. 7, includes the engine 12, the staring device 13, a planetary transmission 314, and the final drive mechanism 16. The planetary transmission 314 includes the input shaft 17, a planetary gear arrangement 318, and the output shaft 19. The planetary gear arrangement 318 includes three planetary gearsets 320, 330, and 340.

The planetary gearset 320 includes a sun gear member 322, a ring gear member 324, and a planet carrier assembly member 326. The planet carrier assembly member 326 includes a plurality of pinion gears 327 rotatably mounted on a planet carrier member 329 and disposed in meshing relationship with the sun gear member 322 and the ring gear member 324.

The planetary gearset 330 includes a sun gear member 332, a ring gear member 334, and a planet carrier assembly member 336. The planet carrier assembly member 336 includes a plurality of pinion gears 337 rotatably mounted on a planet carrier member 339 and disposed in meshing relationship with the sun gear member 332 and the ring gear member 334.

The planetary gearset 340 includes a sun gear member 342, a ring gear member 344, and a planet carrier assembly member 346. The planet carrier assembly member 346 includes a plurality of pinion gears 347 rotatably mounted on a planet carrier member 349 and disposed in meshing relationship with the sun gear member 342 and the ring gear member 344.

The planetary gear arrangement 318 also includes six torque-transmitting mechanisms 350, 352, 354, 356, 358, and 360. All of these torque-transmitting mechanisms are of the rotating type torque-transmitting mechanisms.

The ring gear member 324 and sun gear member 332 are continuously interconnected by an interconnecting member 370, which is continuously connected to the transmission housing 62. The planet carrier assembly member 326 and planet carrier assembly member 336 are continuously connected by an interconnecting member 372, which is selectively connectible with the input shaft 17 through the torque-transmitting mechanism 350, and selectively interconnectible with an interconnecting member 374 through the torque-transmitting mechanism 356, and selectively connectible with the ring gear member 344 and output shaft 19 through the torque-transmitting mechanism 358. The interconnecting member 374 continuously interconnects the planet carrier assembly member 346 and the ring gear member 334. The interconnecting member 374 is selectively connectible with the ring gear member 344 and the output shaft 19 through the torque-transmitting mechanism 360. The input shaft 17 is selectively interconnectible with the sun gear member 322 through the torque-transmitting mechanism 352, and selectively connectible with the sun gear member 342 through the torque-transmitting mechanism 354. The output shaft 19 is continuously interconnected with the ring gear member 344.

The truth table of FIG. 8 describes the engagement combinations for the torque-transmitting mechanisms, as well as the sequence of engagement that is involved in obtaining seven forward speed ratios and a reverse speed ratio between the input shaft 17 and the output shaft 19 through the planetary gear arrangement 318. It can be readily determined from the truth table that all the single step forward interchanges are of the single transition variety. Also given in the truth table of FIG. 8 is a numerical value for each of the speed ratios. These numerical values are determined by the ring gear/sun gear tooth ratios of the planetary gearsets 320, 330, and 340, which are given in FIG. 8 as R1/S1, R2/S2, and R3/S3, respectively. Also provided in FIG. 8 is a chart, which shows the numerical values for the ratio steps between adjacent forward speed ratios as well as between the reverse and first forward speed ratio. The numerical value for the overall ratio spread of the forward speed ratios is also given.

The reverse speed ratio is established with the engagement of the torque-transmitting mechanisms 354 and 356. During the reverse speed ratio, the ring gear member 344 and therefore output shaft 19 are rotated at a speed determined by the speed of the sun gear member 342 and the ring gear/sun gear tooth ratio of the planetary gearset 340. The numerical value of the reverse speed ratio is determined by the ring gear/sun gear tooth ratio of the planetary gearset 340.

The first forward speed ratio is established with the engagement of the torque-transmitting mechanisms 354 and 358. During the first forward speed ratio, the planet carrier assembly member 346 and ring gear member 334 are rotated at a speed determined by the speed of the sun gear member 342, the speed of the ring gear member 344, and the ring gear/sun gear tooth ratio of the planetary gearset 340. The planet carrier assembly member 336, ring gear member 344, and output shaft 19 are rotated at a speed determined by the speed of the ring gear member 334 and the ring gear/sun gear tooth ratio of the planetary gearset 330. The numerical value of the first forward speed ratio is determined by the ring gear/sun gear tooth ratios of the planetary gearsets 330 and 340.

The second forward speed ratio is established with the engagement of the torque-transmitting mechanisms 352 and 358. During the second forward speed ratio, the planet carrier assembly member 326, planet carrier assembly member 336, ring gear member 344, and output shaft 19 are rotated at a speed determined by the speed of the sun gear member 322 and the ring gear/sun gear tooth ratio of the planetary gearset 320. The numerical value of the second forward speed ratio is determined by the ring gear/sun gear tooth ratio of the planetary gearset 320.

The third forward speed ratio is established with the engagement of the torque-transmitting mechanisms 352 and 354. During the third forward speed ratio, the planet carrier assembly members 326 and 336 are rotated at a speed determined by the speed of the sun gear member 322 and the ring gear/sun gear tooth ratio of the planetary gearset 320. The ring gear member 334 and planet carrier assembly member 346 are rotated at a speed determined by the speed of the planet carrier assembly member 336 and the ring gear/sun gear tooth ratio of the planetary gearset 330. The ring gear member 344 and therefore output shaft 19 are rotated at a speed determined by the speed of the planet carrier assembly member 346, the speed of the sun gear member 342, and the ring gear/sun gear tooth ratio of the planetary gearset 340. The numerical value of the third forward speed ratio is determined by the ring gear/sun gear tooth ratios of all three planetary gearsets 320, 330, and 340.

The fourth forward speed ratio is established with the engagement of the torque-transmitting mechanisms 352 and 360. During the fourth forward speed ratio, the planet carrier assembly members 326 and 336 are rotated at a speed determined by the speed of the sun gear member 322 and the ring gear/sun gear tooth ratio of the planetary gearset 320. The ring gear member 334, planetary gearset 340, and output shaft 19 are rotated at a speed determined by the speed of the planet carrier assembly member 336 and the ring gear/sun gear tooth ratio of the planetary gearset 330. The numerical value of the fourth forward speed ratio is determined by the ring gear/sun gear tooth ratios of the planetary gearsets 320 and 330.

The fifth forward speed ratio is established with the engagement of the torque-transmitting mechanisms 354 and 360. During the fifth forward speed ratio, the planetary gearset 320 is in a 1:1 ratio condition such that the input shaft 17 and the output shaft 19 rotate in unison. The numerical value of the fifth forward speed ratio is one.

The sixth forward speed ratio is established with the engagement of the torque-transmitting mechanisms 350 and 360. During the sixth forward speed ratio, the ring gear member 334, planetary gearset 340, and output shaft 19 are rotated at a speed determined by the speed of the planet carrier assembly member 336 and the ring gear/sun gear tooth ratio of the planetary gearset 330. The numerical value of the sixth forward speed ratio is determined by the ring gear/sun gear tooth ratio of the planetary gearset 330.

The seventh forward speed ratio is established with the engagement of the torque-transmitting mechanisms 350 and 354. During the seventh forward speed ratio, the ring gear member 334 and planet carrier assembly member 346 are rotated at a speed determined by the speed of the planet carrier assembly member 336 and the ring gear/sun gear tooth ratio of the planetary gearset 330. The ring gear member 344 and therefore output shaft 19 are rotated at a speed determined by the speed of the planet carrier assembly member 346, the speed of the sun gear member 342, and the ring gear/sun gear tooth ratio of the planetary gearset 340. The numerical value of the seventh forward speed ratio is determined by the ring gear/sun gear tooth ratios of the planetary gearsets 330 and 340.

Figures 9, 10:
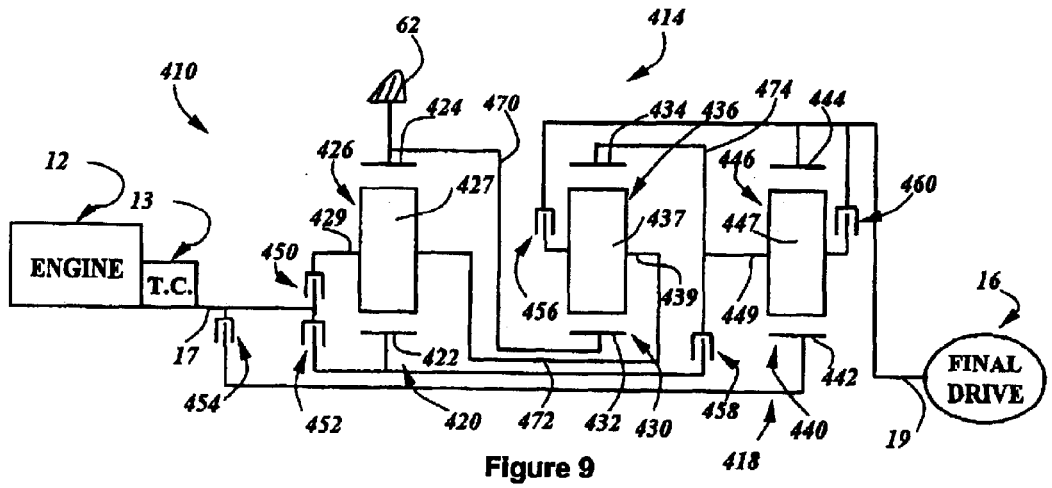
FIG. 9 is a schematic representation of a powertrain having another member of the family of transmissions incorporated therein.
FIG. 10 is truth table and chart depicting some of the operating parameters of the powertrain shown in FIG. 9.

A powertrain 410, shown in FIG. 9, includes the engine 12, the staring device 13, a planetary transmission 414, and the final drive mechanism 16. The planetary transmission 414 includes the input shaft 17, a planetary gear arrangement 418, and the output shaft 19. The planetary gear arrangement 418 includes three planetary gearsets 420, 430, and 440.

The planetary gearset 420 includes a sun gear member 422, a ring gear member 424, and a planet carrier assembly member 426. The planet carrier assembly member 426 includes a plurality of pinion gears 427 rotatably mounted on a planet carrier member 429 and disposed in meshing relationship with the sun gear member 422 and the ring gear member 424.

The planetary gearset 430 includes a sun gear member 432, a ring gear member 434, and a planet carrier assembly member 436. The planet carrier assembly member 436 includes a plurality of pinion gears 437 rotatably mounted on a planet carrier member 439 and disposed in meshing relationship with the sun gear member 432 and the ring gear member 434.

The planetary gearset 440 includes a sun gear member 442, a ring gear member 444, and a planet carrier assembly member 446. The planet carrier assembly member 446 includes a plurality of pinion gears 447 rotatably mounted on a planet carrier member 449 and disposed in meshing relationship with the sun gear member 442 and the ring gear member 444.

The planetary gear arrangement 418 also includes six rotating type torque-transmitting mechanisms 450, 452, 454, 456, 458, and 460.

The sun gear member 432 and ring gear member 424 are continuously interconnected by an interconnecting member 470, which is continuously connected with the transmission housing 62. The planet carrier assembly member 426 and planet carrier assembly member 436 are continuously interconnected by an interconnecting member 472. The ring gear member 434 and planet carrier assembly member 446 are continuously interconnected by an interconnecting member 474. The ring gear member 444 is continuously connected with the output shaft 19.

The input shaft 17 is selectively connectible with the interconnecting member 472 through the torque-transmitting mechanism 450, selectively connectible with the sun gear member 422 through the torque-transmitting mechanism 452, and selectively connectible with the sun gear member 442 through the torque-transmitting mechanism 454. The interconnecting member 474 is selectively connectible with the sun gear member 422 through the torque-transmitting mechanism 458, and selectively connectible with the ring gear member 444 and therefore output shaft 19 through the torque-transmitting mechanism 460. The interconnecting member 472 is selectively connectible with the ring gear member 444 and output shaft 19 through the torque-transmitting mechanism 456.

The torque-transmitting mechanisms are selectively engageable in combinations of two, as shown in the truth table of FIG. 10, to establish seven forward speed ratios and one reverse speed ratio through the planetary gear arrangement 418 between the input shaft 17 and the output shaft 19. The truth table also provides a numerical example for each of the speed ratios for the planetary gear arrangement 418. These numerical examples are established utilizing the ring gear/sun gear tooth ratios of the planetary gearsets 420, 430, and 440, which are given by way of example as R1/S1, R2/S2, and R3/S3, respectively. Also given in FIG. 10 is a chart providing the numerical values for the ratio steps between adjacent forward speed ratios as well as between the reverse and first forward speed ratio. Further information given in the chart of FIG. 10 is the overall ratio spread of the forward speed ratios.

The reverse speed ratio is established with the engagement of the torque-transmitting mechanisms 454 and 458. During the reverse speed ratio, the ring gear member 444 and therefore output shaft 19 are rotated at a speed determined by the speed of the sun gear member 442 and the ring gear/sun gear tooth ratio of the planetary gearset 440. The numerical value of the reverse speed ratio is determined by the ring gear/sun gear tooth ratio of the planetary gearset 440.

The first forward speed ratio is established with the engagement of the torque-transmitting mechanisms 454 and 456. During the first forward speed ratio, the planet carrier assembly member 446 and ring gear member 434 are rotated at a speed determined by the speed of the sun gear member 442, the speed of the ring gear member 444, and the ring gear/sun gear tooth ratio of the planetary gearset 440. The planet carrier assembly member 436, ring gear member 444, and output shaft 19 are rotated at a speed determined by the speed of the ring gear member 434 and the ring gear/sun gear tooth ratio of the planetary gearset 430. The numerical value of the first forward speed ratio is determined by the ring gear/sun gear tooth ratios of the planetary gearsets 430 and 440.

The second forward speed ratio is established with the engagement of the torque-transmitting mechanisms 452 and 456. During the second forward speed ratio, the planet carrier assembly members 436 and 426, the ring gear member 444, and the output shaft 19 are rotated at a speed determined by the speed of the sun gear member 422 and the ring gear/sun gear tooth ratio of the planetary gearset 420. The numerical value of the second forward speed ratio is determined by the ring gear/sun gear tooth ratio of the planetary gearset 420.

The third forward speed ratio is established with the engagement of the torque-transmitting mechanisms 452 and 454. During the third forward speed ratio, the planet carrier assembly members 426 and 436 are rotated at a speed determined by the speed of the sun gear member 422 and the ring gear/sun gear tooth ratio of the planetary gearset 420. The ring gear member 434 and planet carrier assembly member 446 are rotated at a speed determined by the speed of the planet carrier assembly member 436 and the ring gear/sun gear tooth ratio of the planetary gearset 430. The ring gear member 444 and therefore output shaft 19 are rotated at a speed determined by the speed of the planet carrier assembly member 446, the speed of the sun gear member 442, and the ring gear/sun gear tooth ratio of the planetary gearset 440. The numerical value of the third forward speed ratio is determined by the ring gear/sun gear tooth ratios of all three planetary gearsets 420, 430, and 440.

The fourth forward speed ratio is established with the engagement of the torque-transmitting mechanisms 452 and 460. During the fourth forward speed ratio, the planet carrier assembly members 426 and 436 are rotated at a speed determined by the speed of the sun gear member 422 and the ring gear/sun gear tooth ratio of the planetary gearset 420. The ring gear member 434, planetary gearset 440, and output shaft 19 are rotated at a speed determined by the speed of the planet carrier assembly member 436 and the ring gear/sun gear tooth ratio of the planetary gearset 430. The numerical value of the fourth forward speed ratio is determined by the ring gear/sun gear tooth ratios of the planetary gearsets 420 and 430.

The fifth forward speed ratio is established with the engagement of the torque-transmitting mechanisms 454 and 460. During the fifth forward speed ratio, the planetary gearset 440 is in a 1:1 condition whereby the input shaft 17 and the output shaft 19 rotate in unison. The numerical value of the fifth forward speed ratio is therefore one.

The sixth forward speed ratio is established with the engagement of the torque-transmitting mechanisms 450 and 460. During the sixth forward speed ratio, the ring gear member 434, planetary gearset 440, and output shaft 19 are rotated at a speed determined by the speed of the planet carrier assembly member 436 and the ring gear/sun gear tooth ratio of the planetary gearset 430. The numerical value of the sixth forward speed ratio is determined by the ring gear/sun gear tooth ratio of the planetary gearset 430.

The seventh forward speed ratio is established with the engagement of the torque-transmitting mechanisms 450 and 454. During the seventh forward speed ratio, the ring gear member 434 and planet carrier assembly member 446 are rotated at a speed determined by the speed of the planet carrier assembly member 436 and the ring gear/sun gear tooth ratio of the planetary gearset 430. The ring gear member 444 and therefore output shaft 19 are rotated at a speed determined by the speed of the planet carrier assembly member 446, the speed of the sun gear member 442, and the ring gear/sun gear tooth ratio of the planetary gearset 440. The numerical value of the seventh forward speed ratio is determined by the ring gear/sun gear tooth ratios of the planetary gearsets 430 and 440.

Figures 11, 12:
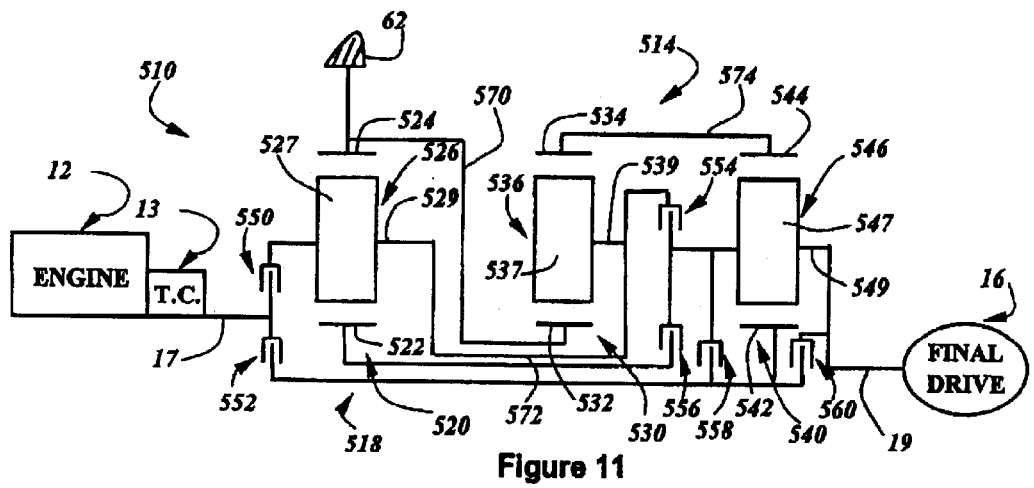
FIG. 11 is a schematic representation of a powertrain having another member of the family of transmissions incorporated therein.
FIG. 12 is truth table and chart depicting some of the operating parameters of the powertrain shown in FIG. 11.

A powertrain 510, shown in FIG. 11, includes the engine 12, the staring device 13, a planetary transmission 514, and the final drive mechanism 16. The planetary transmission 514 includes the input shaft 17, a planetary gear arrangement 518, and the output shaft 19. The planetary gear arrangement 518 includes three planetary gearsets 520, 530, and 540.

The planetary gearset 520 includes a sun gear member 522, a ring gear member 524, and a planet carrier assembly member 526. The planet carrier assembly member 526 includes a plurality of pinion gears 527 rotatably mounted on a planet carrier member 529 and disposed in meshing relationship with the sun gear member 522 and the ring gear member 524.

The planetary gearset 530 includes a sun gear member 532, a ring gear member 534, and a planet carrier assembly member 536. The planet carrier assembly member 536 includes a plurality of pinion gears 537 rotatably mounted on a planet carrier member 539 and disposed in meshing relationship with the sun gear member 532 and the ring gear member 534.

The planetary gearset 540 includes a sun gear member 542, a ring gear member 544, and a planet carrier assembly member 546. The planet carrier assembly member 546 includes a plurality of pinion gears 547 rotatably mounted on a planet carrier member 549 and disposed in meshing relationship with the sun gear member 542 and the ring gear member 544.

The planetary gear arrangement 518 also includes six rotating type torque-transmitting mechanisms 550, 552, 554, 556, 558, and 560.

The ring gear member 524 and sun gear member 532 are continuously interconnected by an interconnecting member 570, which is continuously connected with the transmission housing 62. The planet carrier assembly member 526 and planet carrier assembly member 536 are continuously interconnected by an interconnecting member 572. The ring gear member 534 and ring gear member 544 are continuously interconnected by an interconnecting member 574. The planet carrier member 549 of the planet carrier assembly member 546 is continuously interconnected with the output shaft 19.

The input shaft 17 is selectively connectible with the interconnecting member 572 through the torque-transmitting mechanism 550, and selectively connectible with the sun gear member 542 through the torque-transmitting mechanism 552. The planet carrier member 549 and therefore output shaft 19 are selectively interconnectible with the interconnecting member 572 through the torque-transmitting mechanism 554, and selectively connectible with the sun gear member 522 through the torque-transmitting mechanism 556. The sun gear member 542 is selectively interconnectible with the sun gear member 522 through the torque-transmitting mechanism 558, and selectively connectible with the output shaft 19 through the torque-transmitting mechanism 560.

As seen in the truth table of FIG. 12, the torque-transmitting mechanisms are engaged in combinations of two to establish seven forward speed ratios and one reverse speed ratio between the input shaft 17 and the output shaft 19 through the planetary gear arrangement 518. The truth table also provides a numerical example for each of the speed ratios for the planetary gear arrangement 518. These numerical examples are established utilizing the ring gear/sun gear tooth ratios of the planetary gearsets 520, 530, and 540, which are given by way of example as R1/S1, R2/S2, and R3/S3, respectively. Also given in FIG. 12 is a chart providing the numerical values for the ratio steps between adjacent forward speed ratios as well as between the reverse and first forward speed ratio. Further information given in the chart of FIG. 12 is the overall ratio spread of the forward speed ratios.

The reverse speed ratio is established with the engagement of the torque-transmitting mechanisms 552 and 554. During the reverse speed ratio, the ring gear members 544 and 534 are rotated at a speed determined by the speed of the sun gear member 542, the speed of the planet carrier assembly member 546, and the ring gear/sun gear tooth ratio of the planetary gearset 540. The planet carrier assembly member 536, planet carrier assembly member 546, and output shaft 19 are rotated at a speed determined by the speed of the ring gear member 534 and the ring gear/sun gear tooth ratio of the planetary gearset 530. The numerical value of the reverse speed ratio is determined by the ring gear/sun gear tooth ratios of the planetary gearsets 530 and 540.

The first forward speed ratio is established with the engagement of the torque-transmitting mechanisms 552 and 556. During the first forward speed ratio, the ring gear members 544 and 534 are rotated at a speed determined by the speed of the sun gear member 542, the speed of the planet carrier assembly member 546, and the ring gear/sun gear tooth ratio of the planetary gearset 540. The planet carrier assembly members 536 and 526 are rotated at a speed determined by the speed of the ring gear member 534 and the ring gear/sun gear tooth ratio of the planetary gearset 530. The sun gear member 522, planet carrier assembly member 546, and output shaft 19 are rotated at a speed determined by the speed of the planet carrier assembly member 526 and the ring gear/sun gear tooth ratio of the planetary gearset 520. The numerical value of the first forward speed ratio is determined by the ring gear/sun gear tooth ratios of all three planetary gearsets 520, 530, and 540.

The second forward speed ratio is established with the engagement of the torque-transmitting mechanisms 552 and 558. During the second forward speed ratio, the planet carrier assembly members 526 and 536 are rotated at a speed determined by the speed of the sun gear member 522 and the ring gear/sun gear tooth ratio of the planetary gearset 520. The ring gear members 534 and 544 are rotated at a speed determined by the speed of the planet carrier assembly member 536 and the ring gear/sun gear tooth ratio of the planetary gearset 530. The planet carrier assembly member 546 and therefore output shaft 19 are rotated at a speed determined by the speed of the ring gear member 544, the speed of the sun gear member 542, and the ring gear/sun gear tooth ratio of the planetary gearset 540. The numerical value of the second forward speed ratio is determined by the ring gear/sun gear tooth ratios of all three planetary gearsets 520, 530, and 540.

The third forward speed ratio is established with the engagement of the torque-transmitting mechanisms 552 and 560. This combination of engagements connects the input shaft 17 directly with the output shaft 19 resulting in a numerical value of one for the third forward speed ratio.

The fourth forward speed ratio is established with the engagement of the torque-transmitting mechanisms 550 and 552. During the fourth forward speed ratio, the ring gear members 534 and 544 are rotated at a speed determined by the speed of the planet carrier assembly member 536 and the ring gear/sun gear tooth ratio of the planetary gearset 530. The planet carrier assembly member 546 and therefore output shaft 19 are rotated at a speed determined by the speed of the ring gear member 544, the speed of the sun gear member 542, and the ring gear/sun gear tooth ratio of the planetary gearset 540. The numerical value of the fourth forward speed ratio is determined by the ring gear/sun gear tooth ratios of the planetary gearsets 530 and 540.

The fifth forward speed ratio is established with the engagement of the torque-transmitting mechanisms 550 and 560. During the fifth forward speed ratio, the ring gear member 534, planetary gearset 540, and the output shaft 19 are rotated at a speed determined by the speed of the planet carrier assembly member 536 and the ring gear/sun gear tooth ratio of the planetary gearset 530. The numerical value of the fifth forward speed ratio is determined by the ring gear/sun gear tooth ratio of the planetary gearset 530.

The sixth forward speed ratio is established with the engagement of the torque-transmitting mechanisms 550 and 558. During the sixth forward speed ratio, the sun gear members 522 and 542 are rotated at a speed determined by the speed of the planet carrier assembly member 526 and the ring gear/sun gear tooth ratio of the planetary gearset 520. The ring gear members 534 and 544 are rotated at a speed determined by the speed of the planet carrier assembly member 536 and the ring gear/sun gear tooth ratio of the planetary gearset 530. The planet carrier assembly member 546 and therefore output shaft 19 are rotated at a speed determined by the speed of the ring gear member 544, the speed of the sun gear member 542, and the ring gear/sun gear tooth ratio of the planetary gearset 540. The numerical value of the sixth forward speed ratio is determined by the ring gear/sun gear tooth ratios of all three planetary gearsets 520, 530, and 540.

The seventh forward speed ratio is established with the engagement of the torque-transmitting mechanisms 550 and 556. During the seventh forward speed ratio, the sun gear member 522, planet carrier assembly member 546 and therefore output shaft 19 are rotated at a speed determined by the speed of the planet carrier assembly member 526 and the ring gear/sun gear tooth ratio of the planetary gearset 520. The numerical value of the seventh forward speed ratio is determined by the ring gear/sun gear tooth ratio of the planetary gearset 520.

Figures 13, 14:
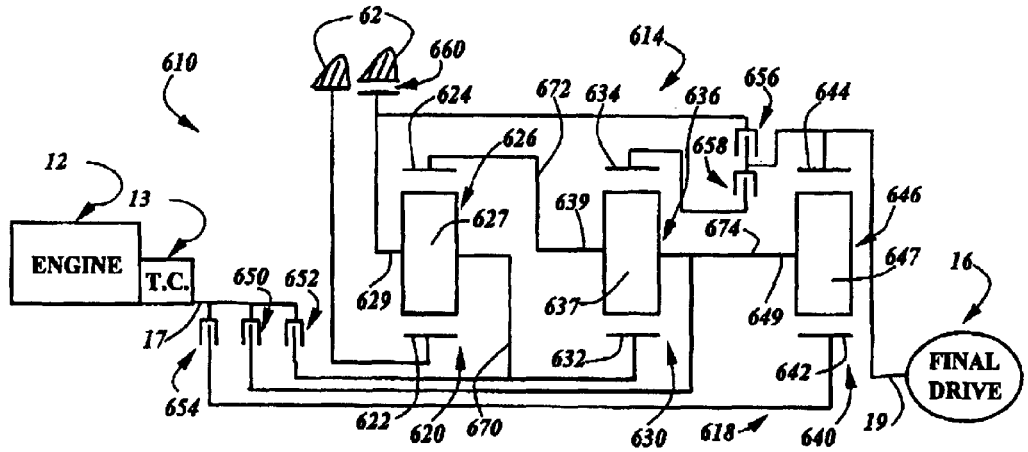
FIG. 13 is a schematic representation of a powertrain having another member of the family of transmissions incorporated therein.
FIG. 14 is truth table and chart depicting some of the operating parameters of the powertrain shown in FIG. 13.

A powertrain 610, shown in FIG. 13, includes the engine 12, the staring device 13, a planetary transmission 614, and the final drive mechanism 16. The planetary transmission 614 includes the input shaft 17, a planetary gear arrangement 618, and the output shaft 19. The planetary gear arrangement 618 includes three planetary gearsets 620, 630, and 640.

The planetary gearset 620 includes a sun gear member 622, a ring gear member 624, and a planet carrier assembly member 626. The planet carrier assembly member 626 includes a plurality of pinion gears 627 rotatably mounted on a planet carrier member 629 and disposed in meshing relationship with the sun gear member 622 and the ring gear member 624.

The planetary gearset 630 includes a sun gear member 632, a ring gear member 634, and a planet carrier assembly member 636. The planet carrier assembly member 636 includes a plurality of pinion gears 637 rotatably mounted on a planet carrier member 639 and disposed in meshing relationship with the sun gear member 632 and the ring gear member 634.

The planetary gearset 640 includes a sun gear member 642, a ring gear member 644, and a planet carrier assembly member 646. The planet carrier assembly member 646 includes a plurality of pinion gears 647 rotatably mounted on a planet carrier member 649 and disposed in meshing relationship with the sun gear member 642 and the ring gear member 644.

The planetary gear arrangement 618 also includes six torque-transmitting mechanisms 650, 652, 654, 656, 658, and 660. The torque-transmitting mechanism 660 is of the stationary type torque-transmitting mechanism, while the remaining torque-transmitting mechanisms are of the rotating type torque-transmitting mechanisms.

The planet carrier assembly member 626 and sun gear member 632 are continuously interconnected by an interconnecting member 670. The ring gear member 624 and planet carrier assembly member 636 are continuously interconnected by an interconnecting member 672. The planet carrier assembly member 636 and planet carrier assembly member 646 are continuously interconnected by an interconnecting member 674. Obviously, the planet carrier member 639 of the planet carrier assembly member 636 is connected with both the interconnecting members 672 and 674. The ring gear member 644 is continuously interconnected with the output shaft 19. The sun gear member 622 is continuously connected with the transmission housing 62.

The input shaft 17 is selectively connectible with the interconnecting members 674 and 672 through the torque-transmitting mechanism 650, selectively connectible with the interconnecting member 670 through the torque-transmitting mechanism 652, and selectively connectible with the sun gear member 642 through the torque-transmitting mechanism 654. The interconnecting member 670 is selectively connectible with the ring gear member 644 and therefore output shaft 19 through the torque-transmitting mechanism 656, and selectively connectible with the transmission housing 62 through the torque-transmitting mechanism 660. The ring gear member 634 is selectively interconnectible with the ring gear member 644 and output shaft 19 through the torque-transmitting mechanism 658.

The torque-transmitting mechanisms are engaged in combinations of two, as shown in the truth table of FIG. 14, in order to provide seven forward speed ratios and one reverse speed ratio through the planetary gear arrangement 618 between the input shaft 17 and the output shaft 19. The truth table of FIG. 14 also provides a numerical example of the speed ratios that are available with the planetary gear arrangement 618 when the ring gear/sun gear tooth ratios of the planetary gearsets 620, 630, and 640 are as given in FIG. 14 as R1/S1, R2/S2, and R3/S3, respectively. Further information provided in FIG. 14 by way of a chart are the numerical values for the ratio steps between adjacent forward speed ratios as well as between the reverse and first forward speed ratio. The chart of FIG. 14 also provides the numerical value for the overall ratio spread of the forward speed ratios.

Upon reviewing the combinations and sequence of engagements shown in the truth table, those skilled in the art will recognize that the numerical value of the reverse speed ratio is determined by the ring gear/sun gear tooth ratio of the planetary gearset 640. The numerical value of the first forward speed ratio and the seventh forward speed ratio is determined by the ring gear/sun gear tooth ratios of the planetary gearsets 620 and 640. The numerical value of the second forward speed ratio is determined by the ring gear/sun gear tooth ratio of the planetary gearset 620. The numerical value of the third forward speed ratio is one. The numerical values of the fourth forward speed ratio and the sixth forward speed ratio are determined by the ring gear/sun gear tooth ratios of the planetary gearsets 620 and 630. The numerical values of the fifth forward speed ratio is determined by the ring gear/sun gear tooth ratios of all three planetary gearsets 620, 630, and 640.

Figures 15, 16:
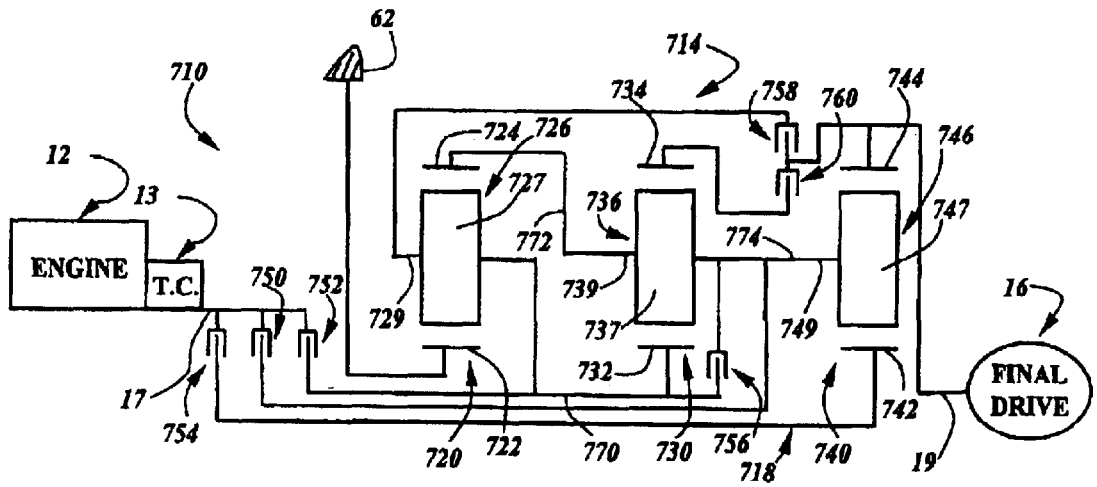
FIG. 15 is a schematic representation of a powertrain having another member of the family of transmissions incorporated therein.
FIG. 16 is truth table and chart depicting some of the operating parameters of the powertrain shown in FIG. 15.

A powertrain 710, shown in FIG. 15, includes the engine 12, the staring device 13, a planetary transmission 714, and the final drive mechanism 16. The planetary transmission 714 includes the input shaft 17, a planetary gear arrangement 718, and the output shaft 19. The planetary gear arrangement 718 includes three planetary gearsets 720, 730, and 740.

The planetary gearset 720 includes a sun gear member 722, a ring gear member 724, and a planet carrier assembly member 726. The planet carrier assembly member 726 includes a plurality of pinion gears 727 rotatably mounted on a planet carrier member 729 and disposed in meshing relationship with the sun gear member 722 and the ring gear member 724.

The planetary gearset 730 includes a sun gear member 732, a ring gear member 734, and a planet carrier assembly member 736. The planet carrier assembly member 736 includes a plurality of pinion gears 737 rotatably mounted on a planet carrier member 739 and disposed in meshing relationship with the sun gear member 732 and the ring gear member 734.

The planetary gearset 740 includes a sun gear member 742, a ring gear member 744, and a planet carrier assembly member 746. The planet carrier assembly member 746 includes a plurality of pinion gears 747 rotatably mounted on a planet carrier member 749 and disposed in meshing relationship with the sun gear member 742 and the ring gear member 744.

The planetary gear arrangement 718 also includes six rotating type torque-transmitting mechanisms 750, 752, 754, 756, 758, and 760.

The planet carrier assembly member 726 and sun gear member 732 are continuously interconnected by an interconnecting member 770. The sun gear member 722 is continuously connected to the transmission housing 62. The ring gear member 724 and planet carrier assembly member 736 are continuously interconnected by an interconnecting member 772. The planet carrier assembly member 746 and planet carrier assembly member 736 are continuously interconnected by an interconnecting member 774. As with the immediately preceding family member, the planet carrier member 739 is continuously connected with both of the interconnecting members 772 and 774. The output shaft 19 is continuously interconnected with the ring gear member 744.

The input shaft 17 is selectively connectible with the interconnecting member 774 and the interconnecting member 772 through the torque-transmitting mechanism 750, selectively interconnectible with the interconnecting member 770 through the torque-transmitting mechanism 752, and selectively interconnectible with the sun gear member 742 through the torque-transmitting mechanism 754. The interconnecting member 770, interconnecting member 774, and interconnecting member 772 are selectively interconnectible through the torque-transmitting mechanism 756. The ring gear member 744 and output shaft 19 are selectively interconnectible with the ring gear member 734 through the torque-transmitting mechanism 760, and selectively connectible with the interconnecting member 770 through the torque-transmitting mechanism 758.

The torque-transmitting mechanisms are selectively engaged in combinations of two, as shown in the truth table of FIG. 16, to establish seven forward speed ratios and one reverse speed ratio between the input shaft 17 and the output shaft 19 through the planetary gear arrangement 718. The truth table of FIG. 16 also provides a numerical example of the speed ratios that are available with the planetary gear arrangement 718 when the ring gear/sun gear tooth ratios of the planetary gearsets 720, 730, and 740 are selected as shown in the example R1/S1, R2/S2, and R3/S3, respectively. A chart in FIG. 16 gives the numerical values for the ratio steps between adjacent forward speed ratios as well as between the reverse and first forward speed ratio. Also given in the chart is the numerical value of the overall ratio spread of the forward speed ratios.

Those skilled in the art, upon reviewing the engagement combinations and sequence, will recognize that the numerical value of the reverse speed ratio is determined by the ring gear/sun gear tooth ratio of the planetary gearset 740. The numerical value of the first forward speed ratio and the seventh forward speed ratio are determined by the ring gear/sun gear tooth ratios of the planetary gearsets 720 and 740. The numerical value of the second forward speed ratio is determined by the ring gear/sun gear tooth ratio of the planetary gearset 720. The numerical value of the third forward speed ratio is one. The numerical value of the fourth forward speed ratio and the sixth forward speed ratio are determined by the ring gear/sun gear tooth ratios of the planetary gearsets 720 and 730. The numerical value of the fifth forward speed ratio is determined by the ring gear/sun gear tooth ratios of all three planetary gearsets 720, 730, and 740.

Figures 17, 18:
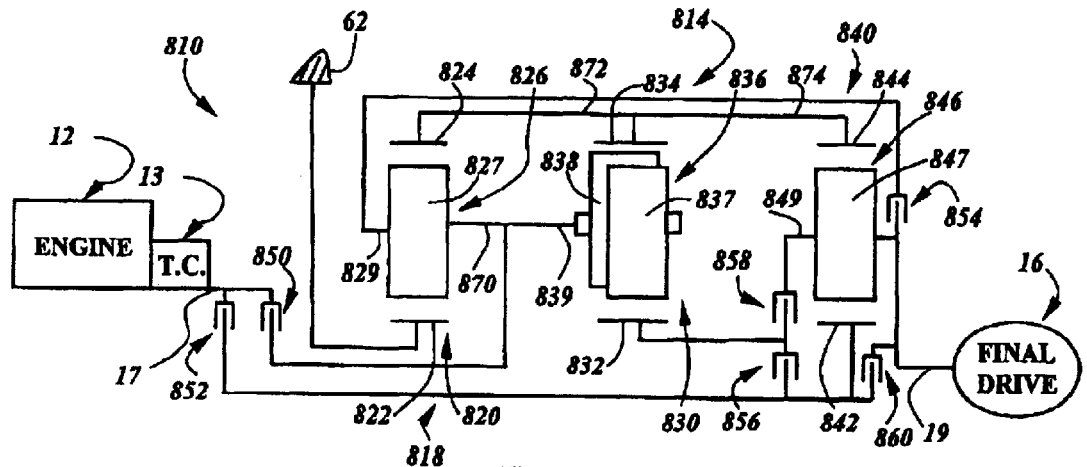
FIG. 17 is a schematic representation of a powertrain having another member of the family of transmissions incorporated therein.
FIG. 18 is truth table and chart depicting some of the operating parameters of the powertrain shown in FIG. 17.

A powertrain 810, shown in FIG. 17, includes the engine 12, the staring device 13, a planetary transmission 814, and the final drive mechanism 16. The planetary transmission 814 includes the input shaft 17, a planetary gear arrangement 818, and the output shaft 19. The planetary gear arrangement 818 includes three planetary gearsets 820, 830, and 840.

The planetary gearset 820 includes a sun gear member 822, a ring gear member 824, and a planet carrier assembly member 826. The planet carrier assembly member 826 includes a plurality of pinion gears 827 rotatably mounted on a planet carrier member 829 and disposed in meshing relationship with the sun gear member 822 and the ring gear member 824.

The planetary gearset 830 includes a sun gear member 832, a ring gear member 834, and a planet carrier assembly member 836. The planet carrier assembly member 836 includes a plurality of pairs of meshing pinion gears 837 and 838, which are rotatably mounted on a planet carrier member 839 and disposed in meshing relationship with the sun gear member 832 and the ring gear member 834. The planetary gearset 830 is a double pinion or compound type planetary arrangement.

The planetary gearset 840 includes a sun gear member 842, a ring gear member 844, and a planet carrier assembly member 846. The planet carrier assembly member 846 includes a plurality of pinion gears 847 rotatably mounted on a planet carrier member 849 and disposed in meshing relationship with the sun gear member 842 and the ring gear member 844.

The planetary gear arrangement 818 also includes six rotating type torque-transmitting mechanisms 850, 852, 854, 856, 858, and 860.

The planet carrier assembly member 826 and planet carrier assembly member 836 are continuously interconnected with an interconnecting member 870. The ring gear members 824 and 834 are continuously interconnected by an interconnecting member 872. The ring gear member 834 and ring gear member 844 are continuously interconnected by an interconnecting member 874. As with the previous two family members, the interconnecting members 872 and 874 are continuously interconnected. The sun gear member 822 is continuously connected with the transmission housing 62. The planet carrier assembly member 846 through its planet carrier member 849 is continuously connected with the output shaft 19.

The input shaft 17 is selectively interconnectible with the interconnecting member 870 through the torque-transmitting mechanism 850, and selectively connectible with the sun gear member 842 through the torque-transmitting mechanism 852. The sun gear member 832 is selectively interconnectible with the sun gear member 842 through the torque-transmitting mechanism 856, and selectively connectible with the output shaft 19 through the torque-transmitting mechanism 858. The interconnecting member 870 is selectively connectible with the output shaft 19 through the torque-transmitting mechanism 854. The sun gear member 842 is selectively connectible with the output shaft 19 through the torque-transmitting mechanism 860.

The torque-transmitting mechanisms are selectively engaged in combinations of two, as shown in the truth table of FIG. 18, to establish seven forward speed ratios and one reverse speed ratio between the input shaft 17 and the output shaft 19 through the planetary gear arrangement 818. Also given in the truth table is a numerical example for the speed ratios that are available in the planetary gear arrangement 818 when the ring gear/sun gear tooth ratios of the planetary gearsets 820, 830, and 840 are as described in FIG. 18 as R1/S1, R2/S2, and R3/S3, respectively. Further information given in FIG. 18 by way of a chart in which the numerical values for the ratio steps between adjacent forward speed ratios as well as between the reverse and first forward speed ratio are given. The chart also provides the numerical value for the overall ratio spread of the forward speed ratios.

Upon reviewing the engagement combinations and sequence, those skilled in the art will recognize that the numerical value of the reverse speed ratio and the fourth forward speed ratio are determined by the ring gear/sun gear tooth ratios of the planetary gearsets 820 and 840. The numerical value of the first forward speed ratio, the second forward speed ratio, and the sixth forward speed ratio are determined by the ring gear/sun gear tooth ratios of all three planetary gearsets 820, 830, and 840. The numerical value of the third forward speed ratio is one. The numerical value of the fifth forward speed ratio is determined by the ring gear/sun gear tooth ratio of the planetary gearset 820. The numerical value of the seventh forward speed ratio is determined by the ring gear/sun gear tooth ratios of the planetary gearsets 820 and 830.

From the foregoing descriptions, it is obvious that the transmission family members each include three planetary gearsets that might be enumerated as first, second, and third sets, and wherein each planetary gearset has three members. These three members are comprised of a sun gear member, a ring gear member, and a planet carrier assembly member. Three interconnecting members are utilized to provide fixed interconnections between a first member of the first planetary gearset and a first member of the second planetary gearset, an interconnection between the second member of the first member of the planetary gearset and a second member of the second planetary gearset, and a continuous interconnection between a first member of the third planetary gearset and one member of the second planetary gearset. A member of the first planetary gearset is continuously connected with the stationary transmission housing and the output shaft is continuously connected with at least one member of one of the planetary gearsets. The interconnections of the first planetary gearset and the stationary member might also include one of the interconnecting members and the interconnection with the output shaft might also include one of the interconnecting members.

Further, each of the family members includes six torque-transmitting mechanisms, which might be either six rotating type torque-transmitting mechanisms or five rotating type torque-transmitting mechanisms and one stationary type torque-transmitting mechanism. These torque-transmitting mechanisms are selectively engageable in combinations of two to provide interconnections between the various transmission components including the input shaft and output shaft in order to establish seven forward speed ratios and one reverse speed ratio in each family member.

It should also be apparent that modifications and variations are possible to the family that are not depicted in the above-described embodiments. Therefore, the invention should only be limited by the appended claims.

What is claimed is:

1. transmission-comprising:
   an input shaft;
   an output shaft;
   a stationary transmission housing;
   a first planetary gearset having first, second, and third members;
   a second planetary gearset having first, second, and third members;
   a third planetary gearset having first, second, and third members;
   a first interconnecting member for interconnecting said first member of said first planetary gearset with said first member of said second planetary gearset;
   a second interconnecting member continuously interconnecting a second member of said first planetary gearset with said second member of said second planetary gearset;
   a third interconnecting member continuously interconnecting a first member of said third planetary gearset with a member selected from a group consisting of said second member of said second planetary gearset and said third member of said second planetary gearset;
   a member of said first planetary gearset being continuously interconnected with said transmission housing;
   said output shaft being continuously connected with at least one member of one of said planetary gearsets; and
   six torque-transmitting mechanisms being selectively engageable in combinations of two to establish at least seven forward speed ratios and one reverse speed ratio within said transmission wherein:
   said first torque transmitting mechanism selectively interconnecting said input shaft with said second interconnecting member, said second torque-transmitting mechanism selectively interconnecting said input shaft with said third member of said first planetary gearset, said third torque-transmitting mechanism selectively interconnecting said input shaft with said third member of said third planetary gearset, said fourth torque-transmitting mechanism selectively interconnecting said second interconnecting member with said output shaft, said fifth a torque-transmitting mechanism selectively interconnecting said third interconnecting member with said output shaft and said sixth torque-transmitting mechanism selectively interconnecting said second interconnecting member with said transmission housing, or
   said first torque-transmitting mechanism selectively interconnecting said input shaft with said second interconnecting member, said second torque-transmitting mechanism selectively interconnecting said input shaft with said third member of said first planetary gearset, said third torque-transmitting mechanism selectively interconnecting said input shaft with said third member of said third planetary gearset, said fourth torque-transmitting mechanism selectively interconnecting said second interconnecting member with said output shaft, said fifth torque-transmitting mechanism selectively interconnecting said third interconnecting member with said output shaft and said sixth torque-transmitting mechanism selectively interconnecting said third member of said first planetary gearset with said transmission housing, or
   said first torque-transmitting mechanism selectively interconnecting said input shaft with said second interconnecting member, said second torque-transmitting mechanism selectively interconnecting said input shaft with said third member of said first planetary gearset, said third torque-transmitting mechanism selectively interconnecting said input shaft with said third member of said third planetary gearset, said fourth torque-transmitting mechanism selectively interconnecting said third member of said first planetary gearset with said second interconnecting member, said fifth torque-transmitting mechanism selectively interconnecting said second interconnecting member with said output shaft, and said sixth torque-transmitting mechanism selectively interconnecting said third interconnecting member with said output shaft, or
   said first torque-transmitting mechanism selectively interconnecting said input shaft with said second interconnecting member, said second torque-transmitting mechanism selectively interconnecting said input shaft with said third member of said first planetary gearset, said third torque-transmitting mechanism selectively interconnecting said input shaft with said third member of said third planetary gearset, said fourth torque-transmitting mechanism selectively interconnecting said second interconnecting member with said third interconnecting member, said fifth torque-transmitting mechanism selectively interconnecting said second interconnecting member with said output shaft, and said sixth torque-transmitting mechanism selectively interconnecting said third interconnecting member with paid output shaft, or
   said first torque transmitting mechanism selectively interconnecting said input shaft with said second interconnecting member, said second torque-transmitting mechanism selectively interconnecting said input shaft with said third member of said first planetary gearset, said third torque-transmitting mechanism selectively interconnecting said input shaft with said third member of said third planetary gearset, said fourth torque-transmitting mechanism selectively interconnecting said second interconnecting member with said output shaft, said fifth torque-transmitting mechanism selectively interconnecting said third member of said first planetary gearset with said third interconnecting member, and said sixth torque-transmitting mechanism selectively interconnecting said third interconnecting member with said output shaft, or said first torque-transmitting mechanism selectively interconnecting said input shaft with said second interconnecting member, said second torque-transmitting mechanism selectively interconnecting said input shaft with said third member of said third planetary gearset, said third torque-transmitting mechanism selectively interconnecting said second interconnecting member with said output shaft, said fourth torque-transmitting mechanism selectively interconnecting said third member of said first planetary gearset with said output shaft, said fifth torque-transmitting mechanism selectively interconnecting said third member of said first planetary gearset with said third member of said third planetary gearset, and said sixth torque-transmitting mechanism selectively interconnecting said third member of said third planetary gearset with said output shaft, or said first torque-transmitting mechanism selectively interconnecting said input shaft with said third interconnecting member, said second torque-transmitting mechanism selectively interconnecting said input shaft with said first interconnecting member, said third torque-transmitting mechanism selectively interconnecting said input shaft with said third member of said third planetary gearset, said fourth torque-transmitting mechanism selectively interconnecting said first interconnecting member with said output shaft, said fifth torque-transmitting mechanism selectively interconnecting said third member of said second planetary gearset with said output shaft, and said sixth torque-transmitting mechanism selectively interconnecting said first interconnecting member with said housing, or said first torque-transmitting mechanism selectively interconnecting said input shaft with said third interconnecting member, said second torque-transmitting mechanism selectively interconnecting said input shaft with said first interconnecting member, said third torque-transmitting mechanism selectively interconnecting said input shaft with said third member of said third planetary gearset, said fourth torque-transmitting mechanism selectively interconnecting said first interconnecting member with said third interconnecting member, said fifth torque-transmitting mechanism selectively interconnecting said first interconnecting member with said output shaft, and said sixth torque-transmitting mechanism selectively interconnecting said third member of said second planetary gearset with said output shaft, or said first torque-transmitting mechanism selectively interconnecting said input shaft with said first interconnecting member, said second torque transmitting mechanism selectively interconnecting an said input shaft with said third member of said third planetary gearset, said third torque-transmitting mechanism selectively interconnecting said first interconnecting member with said output shaft, said fourth torque-transmitting mechanism selectively interconnecting said third member of said second planetary gearset with said third member of third planetary gearset, said fifth torque-transmitting mechanism selectively interconnecting said third member of said second planetary gearset with said output shaft, and said sixth torque-transmitting mechanism selectively interconnecting said third member of said third planetary gearset with said output shaft.

2. A transmission-comprising:

an input shaft;

an output shaft;

a transmission housing;

a first planetary gearset having first, second, and third members;

a second planetary gearset having first, second, and third members;

a third planetary gearset having first, second, and third members;

a first interconnecting member continuously interconnecting said first member of said first planetary gearset with said first member of said second planetary gearset;

a second interconnecting member continuously interconnecting said second member of said first planetary gearset with said second member of said second planetary gearset;

a third interconnecting member continuously interconnecting said first member of said third planetary gearset with one of said second and third members of said second planetary gearset;

said output shaft being continuously interconnected with at least one member of one of the planetary gearsets;

said transmission housing being continuously interconnected with a member of said first planetary gearset;

six torque-transmitting mechanisms being selectively engageable in combinations of two to establish at least seven forward speed ratios and one reverse speed ratio in the planetary gearsets; and at least two of said torque-transmitting mechanisms being selectively engageable between said input shaft and respective members of the planetary gearsets.

3. The transmission defined in claim 2 further wherein:

said first member of said first planetary gearset is selected from a group consisting of a sun gear member, a ring gear member, and a planet carrier assembly member; said second member of said first planetary gearset is selected from a group consisting of a sun gear member, a ring gear member, and a planet carrier assembly member not selected as said first member, and said third member of said first planetary gearset is selected from a group consisting of a sun gear member, a ring gear member, and a planet carrier assembly member not selected as said first and second member;

said first member of said second planetary gearset is selected from a group consisting of a sun gear member, a ring gear member, and a planet carrier assembly member, said second member of said second planetary gearset is selected from a group consisting of a sun gear member, a ring gear member, and a planet carrier assembly member not selected as said first member, and said third member of said second planetary gearset is selected from a group consisting of a sun gear member, a ring gear member, and a planet carrier assembly member not selected as said first and second member; and said first member of said third planetary gearset is selected from a group consisting of a sun gear member, a ring gear member, and a planet carrier assembly member, said second member of said third planetary gearset is selected from a group consisting of a sun gear member, a ring gear member, and a planet carrier assembly member not selected as said first member, and said third member of said third planetary gearset is selected from a group consisting of a sun gear member, a ring gear member, and a planet carrier assembly member not selected as said first and second member.

4. A transmission comprising:

an input shaft;

an output shaft;

a transmission housing;

a first planetary gearset having first, second, and third members;

a second planetary gearset having first, second, and third members;

a third planetary gearset having first, second, and third members;

a first interconnecting member continuously interconnecting said first member of said first planetary gearset with said first member of said second planetary gearset;

a second interconnecting member continuously interconnecting said second member of said first planetary gearset with said second member of said second planetary gearset;

a third interconnecting member continuously interconnecting said first member of said third planetary gearset with a member of said second planetary gearset;

said output shaft being continuously interconnected with said second member of said third planetary gearset;

said transmission housing being continuously interconnected with a member of said first planetary gearset; and said six torque transmitting mechanisms being selectively engaged in combinations of two to establish at least seven forward speed ratios and one reverse speed ratio between said input shaft and said output shaft wherein either:

said first torque-transmitting mechanism selectively interconnecting said input shaft with said second interconnecting member, said second torque-transmitting mechanism selectively interconnecting said input shaft with said third member of said first planetary gearset, said third torque-transmitting mechanism selectively interconnecting said input shaft with said third member of said third planetary gearset, said fourth torque-transmitting mechanism selectively interconnecting said second interconnecting member with said second member of said third planetary gearset, said fifth torque-transmitting mechanism selectively interconnecting said third interconnecting member with said second member of said third planetary gearset, and said sixth torque-transmitting mechanism selectively interconnecting said second interconnecting member with said transmission housing, or said sixth torque-transmitting mechanism selectively interconnecting said third member of said first planetary gearset with said transmission housing, or said fifth torque-transmitting mechanism selectively interconnecting said third member of said first planetary gearset with said third interconnecting member, and said sixth torque-transmitting mechanism selectively interconnecting said third interconnecting member with said second member of said third planetary gearset, or said fifth torque-transmitting mechanism selectively interconnecting said second interconnecting member with said second member of said third planetary gearset, said sixth torque-transmitting mechanism selectively interconnecting said third interconnecting member with said second member of said third planetary gearset, said fourth torque-transmitting mechanism selectively interconnecting said third member of said first planetary gearset with said second interconnecting member or second interconnecting member with said third interconnecting member, or said second torque-transmitting mechanism selectively interconnecting said input shaft with said third member of said third planetary gearset, said third torque-transmitting mechanism selectively interconnecting said second interconnecting member with said second member of said third planetary gearset, said fourth torque-transmitting mechanism selectively interconnecting said third member of said first planetary gearset with said second member of said third planetary gearset, said fifth torque-transmitting mechanism selectively interconnecting said third member of said first planetary gearset with said third member of said third planetary gearset, and said sixth torque-transmitting mechanism selectively interconnecting said third member of said third planetary gearset with said second member of said third planetary gearset, or said first torque-transmitting mechanism selectively interconnecting said input shaft with said third interconnecting member, said second torque-transmitting mechanism selectively interconnecting said input shaft with said first interconnecting member, said third torque-transmitting mechanism selectively interconnecting said input shaft with said third member of said third planetary gearset, said fourth torque-transmitting mechanism selectively interconnecting said first interconnecting member with said second member of said third planetary gearset, said fifth torque-transmitting mechanism selectively interconnecting said third member of said second planetary gearset with said second member of said third planetary gearset, and said sixth torque-transmitting mechanism selectively interconnecting said first interconnecting member with said transmission housing, or said fourth torque-transmitting mechanism selectively interconnecting said first interconnecting member with said third interconnecting member, said fifth torque-transmitting mechanism selectively interconnecting said first interconnecting member with said second member of said third planetary gearset, and said sixth torque-transmitting mechanism selectively interconnecting said third member of said second planetary gearset with said second member of said third planetary gearset, said first torque-transmitting mechanism selectively interconnecting said input shaft with said first interconnecting member, said second torque-transmitting mechanism selectively interconnecting said input shaft with said third member of said third planetary gearset, said third torque-transmitting mechanism selectively interconnecting said first interconnecting member with said second member of said third planetary gearset, said fourth torque-transmitting mechanism selectively interconnecting said third member of said second planetary gearset with said third member of said third planetary gearset, said fifth torque-transmitting mechanism selectively interconnecting said third member of said second planetary gearset with said second member of said third planetary gearset, and said sixth torque-transmitting mechanism selectively interconnecting said third member of said third planetary gearset with said second member of said third planetary gearset.

5. The transmissions defined in claim 4 further wherein:

said first member of said first planetary gearset is selected from a group consisting of a sun gear member, a ring gear member, and a planet carrier assembly member, said second member of said first planetary gearset is selected from a group consisting of a sun gear member, a ring gear member, and a planet carrier assembly member not selected as said first member, and said third member of said first planetary gearset is selected from a group consisting of a sun gear member, a ring gear member, and a planet carrier assembly member not selected as said first and second member;

said first member of said second planetary gearset is selected from a group consisting of a sun gear member, a ring gear member, and a planet carrier assembly member, said second member of said second planetary gearset is selected from a group consisting of a sun gear member, a ring gear member, and a planet carrier assembly member not selected as said first member, and said third member of said second planetary gearset is selected from a group consisting of a sun gear member, a ring gear member, and a planet carrier assembly member not selected as said first and second member; and said first member said third planetary gearset is selected from a group consisting of a sun gear member, a ring gear member, and a planet carrier assembly member, said second member of said third planetary gearset is selected from a group consisting of a sun gear member, a ring gear member, and a planet carrier assembly member not selected as said first member, and said third member of said third planetary gearset is selected from a group consisting of a sun gear member, a ring gear member, and a planet carrier assembly member not selected as said first and second member.

* * * * *